US012777389B2

(12) United States Patent
Jang et al.

(10) Patent No.: US 12,777,389 B2
(45) Date of Patent: Oct. 27, 2026

(54) METHOD AND DEVICE FOR MULTI-LINK DEVICE-BASED ROAMING IN WIRELESS LAN SYSTEM

(71) Applicant: LG ELECTRONICS INC., Seoul (KR)

(72) Inventors: Insun Jang, Seoul (KR); Jinsoo Choi, Seoul (KR); Sunhee Baek, Seoul (KR); Geonhwan Kim, Seoul (KR); Yelin Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/312,112

(22) Filed: Aug. 27, 2025

(65) Prior Publication Data

US 2025/0380199 A1 Dec. 11, 2025

Related U.S. Application Data

(63) Continuation of application No. PCT/KR2024/002128, filed on Feb. 16, 2024.

(30) Foreign Application Priority Data

Feb. 27, 2023 (KR) ........................ 10-2023-0026133
Mar. 3, 2023 (KR) ........................ 10-2023-0028723
Mar. 8, 2023 (KR) ........................ 10-2023-0030784

(51) Int. Cl.
*H04W 4/00* (2018.01)
*H04W 12/0431* (2021.01)
(Continued)

(52) U.S. Cl.
CPC ..... *H04W 36/185* (2023.05); *H04W 12/0431* (2021.01); *H04W 12/06* (2013.01); *H04W 36/08* (2013.01)

(58) Field of Classification Search
CPC ........... H04W 36/185; H04W 12/0431; H04W 12/06; H04W 36/08
(Continued)

(56) References Cited

U.S. PATENT DOCUMENTS 10,194,268 B1 * 1/2019 Chu ...................... H04W 4/023
10,673,677 B2 * 6/2020 Wu ...................... H04L 27/361
(Continued)

FOREIGN PATENT DOCUMENTS

WO 2016028124 2/2016
WO 2021178097 9/2021

OTHER PUBLICATIONS

PCT International Application No. PCT/KR2024/002128, International Search Report dated May 27, 2024, 3 pages.
(Continued)

*Primary Examiner* — Marceau Milord
(74) *Attorney, Agent, or Firm* — LEE, HONG, DEGERMAN, KANG & WAIMEY

(57) ABSTRACT

A method and a device for multi-link device (MLD)-based roaming in a wireless LAN system are disclosed. The method performed by a first STA in a wireless LAN system comprises the steps of: receiving, from a first AP included in a first group, notice information related to MLD-based roaming and comprising at least one group ID; transmitting, to the first AP, a first request frame comprising a link ID of a second AP and a group ID related to a second group comprising the second AP; and receiving, from the first AP, a first response frame comprising the link ID of the second AP and the group ID related to the second group, wherein the first response frame may comprise TID-to-link mapping information about a new link related to the second AP, and an AID for the first STA in the second group.

9 Claims, 17 Drawing Sheets

(51) Int. Cl.
*H04W 12/06* (2021.01)
*H04W 36/08* (2009.01)
*H04W 36/18* (2009.01)

(58) Field of Classification Search
USPC .......................... 370/331, 329, 341, 348, 447
See application file for complete search history.

(56) References Cited

U.S. PATENT DOCUMENTS

| | | | | |
|---|---|---|---|---|
| 11,228,963 | B2* | 1/2022 | Patil | H04W 48/08 |
| 11,438,188 | B2* | 9/2022 | Kim | H04L 45/16 |
| 11,838,770 | B2* | 12/2023 | Kim | H04L 1/1642 |
| 11,838,788 | B2* | 12/2023 | Kwon | H04W 28/0268 |
| 11,863,978 | B2* | 1/2024 | Ho | H04W 12/76 |
| 11,902,866 | B2* | 2/2024 | Kwon | H04W 76/15 |
| 12,096,252 | B2* | 9/2024 | Gupta | H04W 16/18 |
| 12,250,077 | B2* | 3/2025 | Dong | H04L 1/1825 |
| 2008/0220769 | A1* | 9/2008 | Qi | H04W 52/0216 455/426.1 |
| 2008/0220770 | A1 | 9/2008 | Qi et al. | |
| 2018/0083793 | A1* | 3/2018 | Kim | H04L 45/16 |
| 2019/0075008 | A1* | 3/2019 | Wu | H04L 1/0071 |
| 2019/0150214 | A1* | 5/2019 | Zhou | H04W 76/15 370/329 |
| 2019/0158993 | A1* | 5/2019 | Kwon | H04L 5/0032 |
| 2020/0396568 | A1* | 12/2020 | Huang | H04W 76/40 |
| 2021/0014776 | A1* | 1/2021 | Patil | H04W 76/11 |
| 2021/0282119 | A1* | 9/2021 | Asterjadhi | H04W 76/15 |
| 2022/0022033 | A1* | 1/2022 | Ho | H04W 12/037 |
| 2022/0225200 | A1 | 7/2022 | Smith et al. | |
| 2022/0338026 | A1* | 10/2022 | Cariou | H04W 74/08 |
| 2022/0417809 | A1* | 12/2022 | Kneckt | H04L 5/0098 |
| 2022/0418022 | A1* | 12/2022 | Kneckt | H04W 36/06 |
| 2023/0006773 | A1* | 1/2023 | Dong | H04L 1/1685 |
| 2023/0007540 | A1* | 1/2023 | Nayak | H04W 28/24 |
| 2023/0110142 | A1* | 4/2023 | Gan | H04W 4/06 370/312 |
| 2023/0147562 | A1* | 5/2023 | Kneckt | H04W 12/06 380/270 |
| 2023/0164595 | A1* | 5/2023 | Gupta | H04W 16/18 370/255 |
| 2024/0007846 | A1* | 1/2024 | Kneckt | H04W 8/26 |
| 2024/0007918 | A1* | 1/2024 | Patil | H04W 76/15 |
| 2024/0236639 | A1* | 7/2024 | Chu | H04W 76/15 |
| 2024/0244662 | A1* | 7/2024 | Kim | H04W 74/002 |

OTHER PUBLICATIONS

Evgeny Khorov et al., “Current Status and Directions of IEEE 802.11be, the Future Wi-Fi 7”, IEEE Access, vol. 8, May 2020, 25 pages.

* cited by examiner

FIG. 15

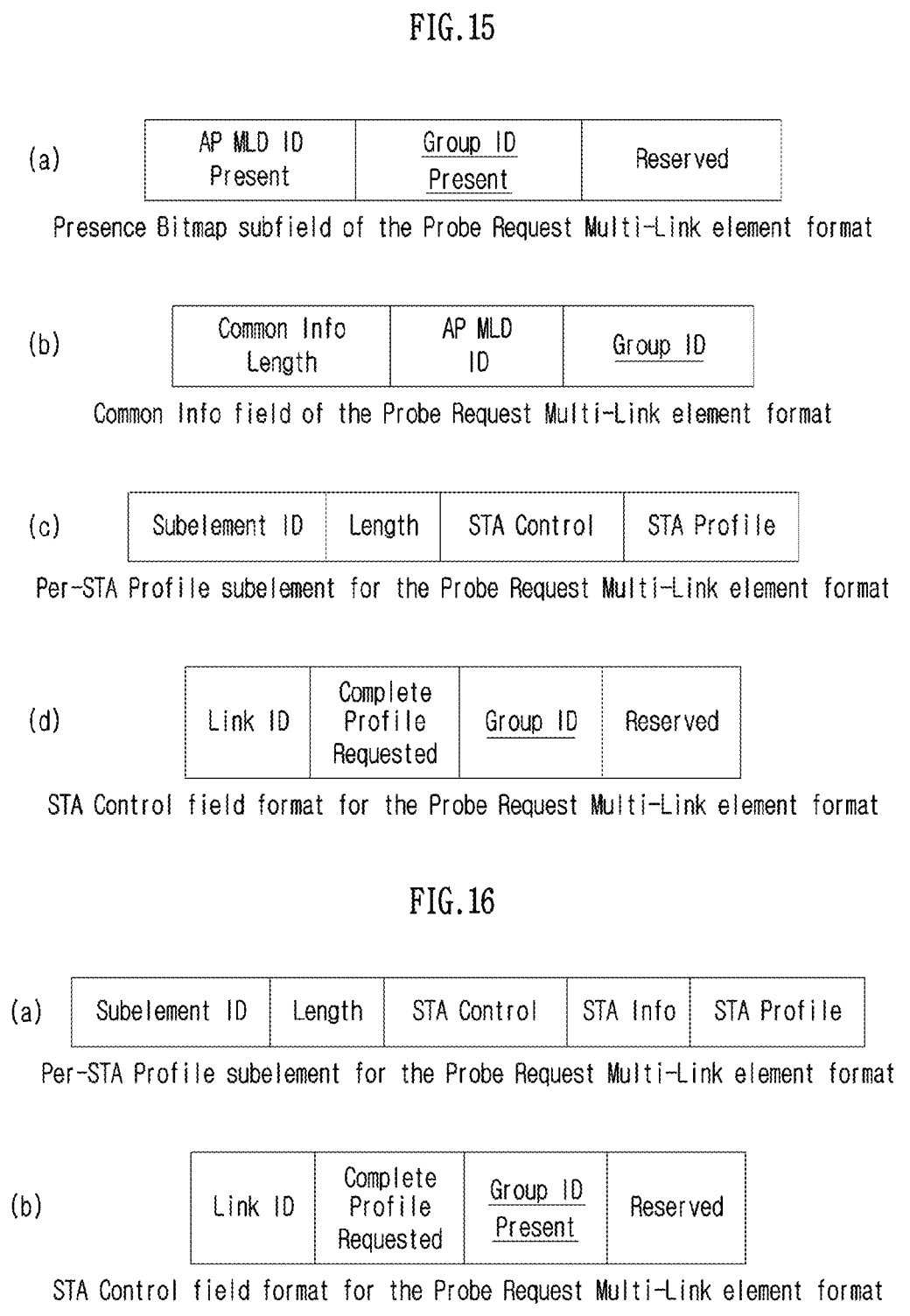

(a)

| | | |
|---|---|---|
| AP MLD ID Present | Group ID Present | Reserved |

Presence Bitmap subfield of the Probe Request Multi-Link element format (b)

| | | |
|---|---|---|
| Common Info Length | AP MLD ID | Group ID |

Common Info field of the Probe Request Multi-Link element format (c)

| | | | |
|---|---|---|---|
| Subelement ID | Length | STA Control | STA Profile |

Per-STA Profile subelement for the Probe Request Multi-Link element format (d)

| | | | |
|---|---|---|---|
| Link ID | Complete Profile Requested | Group ID | Reserved |

STA Control field format for the Probe Request Multi-Link element format

FIG. 16

(a)

| | | | | |
|---|---|---|---|---|
| Subelement ID | Length | STA Control | STA Info | STA Profile |

Per-STA Profile subelement for the Probe Request Multi-Link element format (b)

| | | | |
|---|---|---|---|
| Link ID | Complete Profile Requested | Group ID Present | Reserved |

STA Control field format for the Probe Request Multi-Link element format

FIG. 19

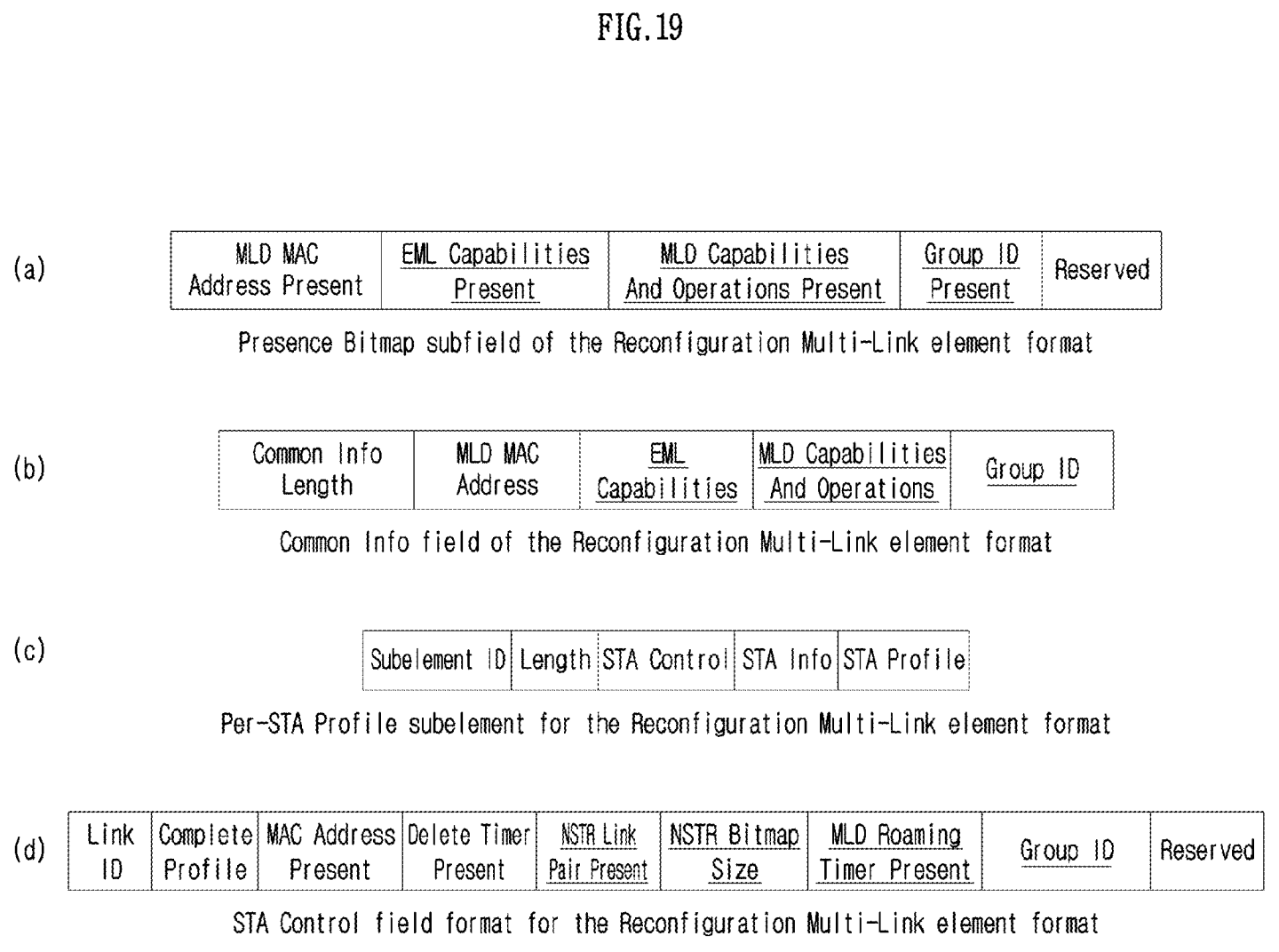

(a)

| | | | | |
|---|---|---|---|---|
| MLD MAC Address Present | EML Capabilities Present | MLD Capabilities And Operations Present | Group ID Present | Reserved |

Presence Bitmap subfield of the Reconfiguration Multi-Link element format (b)

| | | | | |
|---|---|---|---|---|
| Common Info Length | MLD MAC Address | EML Capabilities | MLD Capabilities And Operations | Group ID |

Common Info field of the Reconfiguration Multi-Link element format (c)

| | | | | |
|---|---|---|---|---|
| Subelement ID | Length | STA Control | STA Info | STA Profile |

Per-STA Profile subelement for the Reconfiguration Multi-Link element format (d)

| | | | | | | | | |
|---|---|---|---|---|---|---|---|---|
| Link ID | Complete Profile | MAC Address Present | Delete Timer Present | NSTR Link Pair Present | NSTR Bitmap Size | MLD Roaming Timer Present | Group ID | Reserved |

STA Control field format for the Reconfiguration Multi-Link element format

FIG. 20

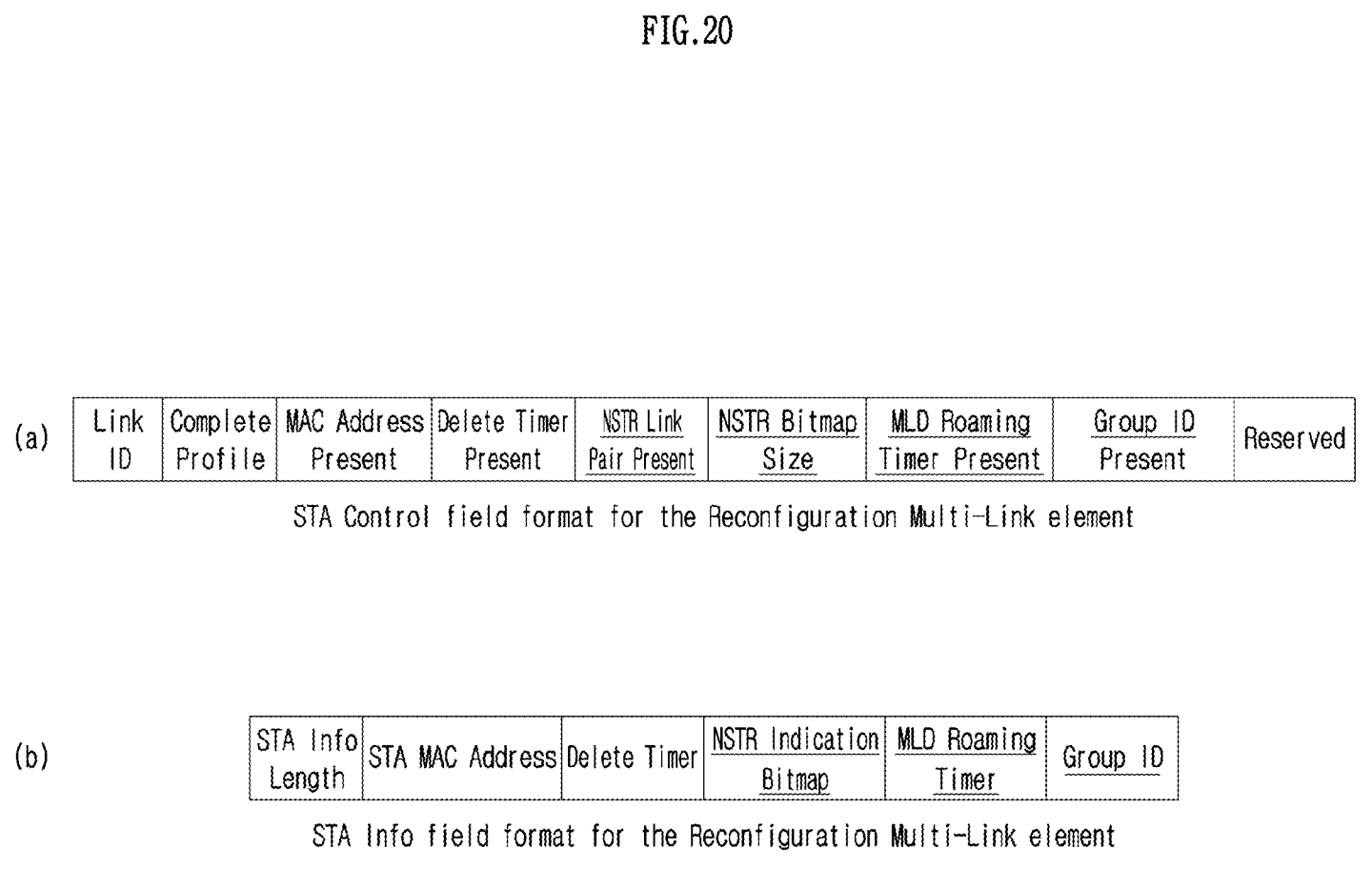

(a)

| | | | | | | | | |
|---|---|---|---|---|---|---|---|---|
| Link ID | Complete Profile | MAC Address Present | Delete Timer Present | NSTR Link Pair Present | NSTR Bitmap Size | MLD Roaming Timer Present | Group ID Present | Reserved |

STA Control field format for the Reconfiguration Multi-Link element (b)

| | | | | | |
|---|---|---|---|---|---|
| STA Info Length | STA MAC Address | Delete Timer | NSTR Indication Bitmap | MLD Roaming Timer | Group ID |

STA Info field format for the Reconfiguration Multi-Link element

METHOD AND DEVICE FOR MULTI-LINK DEVICE-BASED ROAMING IN WIRELESS LAN SYSTEM

CROSS-REFERENCE TO RELATED APPLICATIONS

This application is a continuation of International Application No. PCT/KR2024/002128, filed on Feb. 16, 2024, which claims the benefit of earlier filing date and right of priority to Korean Patent Application Nos. 10-2023-0026133, filed on Feb. 27, 2023, 10-2023-0028723, filed on Mar. 3, 2023, and 10-2023-0030784, filed on Mar. 8, 2023, the contents of which are all hereby incorporated by reference herein in their entirety.

TECHNICAL FIELD

The present disclosure relates to a roaming method and device based on a multi-link device (MLD) in a wireless local area network (WLAN) system.

BACKGROUND ART

New technologies for improving transmission rates, increasing bandwidth, improving reliability, reducing errors, and reducing latency have been introduced for a wireless LAN (WLAN). Among WLAN technologies, an Institute of Electrical and Electronics Engineers (IEEE) 802.11 series standard may be referred to as Wi-Fi. For example, technologies recently introduced to WLAN include enhancements for Very High-Throughput (VHT) of the 802.11ac standard, and enhancements for High Efficiency (HE) of the IEEE 802.11ax standard.

In order to provide a more advanced wireless communication environment, improved technologies for Extremely High Throughput (EHT) are being discussed. For example, technologies for MIMO and multiple access point (AP) coordination that support increased bandwidth, efficient utilization of multiple bands, and increased spatial streams are being studied, and in particular, various technologies are being studied to support low latency or real-time traffic. Furthermore, new technologies are being discussed to support ultra high reliability (UHR), including improvements or extensions of EHT technologies.

SUMMARY

The technical problem of the present disclosure is to provide a method and device for roaming based on a multi-link device (MLD) in a wireless LAN system.

An additional technical problem of the present disclosure is to provide a method and device for supporting or performing roaming of a station (STA) between different access points (APs) affiliated with a common MLD in a wireless LAN system.

An additional technical problem of the present disclosure is to provide a method and device for supporting or performing roaming after setting a group ID for a plurality of APs constituting an AP MLD in a wireless LAN system.

The technical objects to be achieved by the present disclosure are not limited to the above-described technical objects, and other technical objects which are not described herein will be clearly understood by those skilled in the pertinent art from the following description.

A method performed by a first station (STA) in a wireless LAN system according to one aspect of the present disclosure may include receiving, from a first access point (AP) included in a first group, announcement information related to roaming based on a multi-link device (MLD) including at least one group identifier (ID); transmitting, to the first AP, a first request frame including a link ID of a second AP and a group ID associated with a second group including the second AP; and receiving, from the first AP, a first response frame including the link ID of the second AP and the group ID associated with the second group, and the first response frame may include traffic identifier-to-link mapping information for a new link associated with the second AP and an association ID (AID) for the first STA within the second group.

A method performed by a first access point (AP) in a wireless LAN system according to another aspect of the present disclosure may include transmitting, to a first station (STA), announcement information related to roaming based on a multi-link device (MLD) including at least one group identifier (ID); receiving, from the first STA, a first request frame including a link ID of a second AP and a group ID associated with a second group including the second AP; and transmitting, to the first STA, a first response frame including the link ID of the second AP and the group ID associated with the second group, and the first response frame may include traffic identifier-to-link mapping information for a new link associated with the second AP and an association ID (AID) for the first STA within the second group.

According to the present disclosure, a method and device for roaming based on a multi-link device (MLD) in a wireless LAN system may be provided.

According to the present disclosure, a method and device for supporting or performing roaming of a station (STA) between different access points (APs) affiliated with a common MLD in a wireless LAN system may be provided.

According to the present disclosure, a method and device for supporting or performing roaming after setting a group ID for a plurality of APs constituting an AP MLD in a wireless LAN system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 15 and FIG. 16 are diagrams illustrating an example of a probe request ML element according to the present disclosure.

FIG. 19 and FIG. 20 are diagrams illustrating an example of a reconfiguration ML element according to the present disclosure.

DETAILED DESCRIPTION

Figure 1:
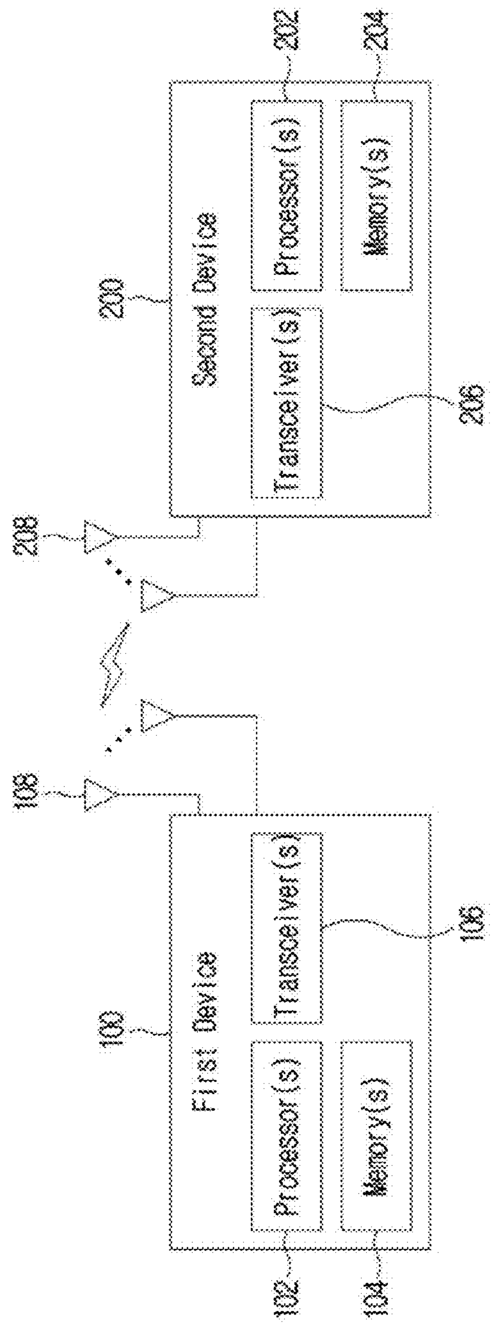
FIG. 1 illustrates a block configuration diagram of a wireless communication device according to an embodiment of the present disclosure.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

Examples of the present disclosure may be applied to various wireless communication systems. For example, examples of the present disclosure may be applied to a wireless LAN system. For example, examples of the present disclosure may be applied to an IEEE 802.11a/g/n/ac/ax standards-based wireless LAN. Furthermore, examples of the present disclosure may be applied to a wireless LAN based on the newly proposed IEEE 802.11be (or EHT) standard. Examples of the present disclosure may be applied to an IEEE 802.11be Release-2 standard-based wireless LAN corresponding to an additional enhancement technology of the IEEE 802.11be Release-1 standard. Additionally, examples of the present disclosure may be applied to a next-generation standards-based wireless LAN after IEEE 802.11be. Further, examples of this disclosure may be applied to a cellular wireless communication system. For example, it may be applied to a cellular wireless communication system based on Long Term Evolution (LTE)-based technology and 5G New Radio (NR)-based technology of the 3rd Generation Partnership Project (3GPP) standard.

Hereinafter, technical features to which examples of the present disclosure may be applied will be described.

FIG. 1 illustrates a block diagram of a wireless communication device according to an embodiment of the present disclosure.

The first device 100 and the second device 200 illustrated in FIG. 1 may be replaced with various terms such as a terminal, a wireless device, a Wireless Transmit Receive Unit (WTRU), an User Equipment (UE), a Mobile Station (MS), an user terminal (UT), a Mobile Subscriber Station (MSS), a Mobile Subscriber Unit (MSU), a subscriber station (SS), an advanced mobile station (AMS), a wireless terminal (WT), or simply user, etc. In addition, the first device 100 and the second device 200 include an access point (AP), a base station (BS), a fixed station, a Node B, a base transceiver system (BTS), a network. It may be replaced with various terms such as an Artificial Intelligence (AI) system, a road side unit (RSU), a repeater, a router, a relay, and a gateway.

The devices 100 and 200 illustrated in FIG. 1 may be referred to as stations (STAs). For example, the devices 100 and 200 illustrated in FIG. 1 may be referred to by various terms such as a transmitting device, a receiving device, a transmitting STA, and a receiving STA. For example, the STAs 110 and 200 may perform an access point (AP) role or a non-AP role. That is, in the present disclosure, the STAs 110 and 200 may perform functions of an AP and/or a non-AP. When the STAs 110 and 200 perform an AP function, they may be simply referred to as APs, and when the STAs 110 and 200 perform non-AP functions, they may be simply referred to as STAs. In addition, in the present disclosure, an AP may also be indicated as an AP STA.

Referring to FIG. 1, the first device 100 and the second device 200 may transmit and receive radio signals through various wireless LAN technologies (e.g., IEEE 802.11 series). The first device 100 and the second device 200 may include an interface for a medium access control (MAC) layer and a physical layer (PHY) conforming to the IEEE 802.11 standard.

In addition, the first device 100 and the second device 200 may additionally support various communication standards (e.g., 3GPP LTE series, 5G NR series standards, etc.) technologies other than wireless LAN technology. In addition, the device of the present disclosure may be implemented in various devices such as a mobile phone, a vehicle, a personal computer, augmented reality (AR) equipment, and virtual reality (VR) equipment, etc. In addition, the STA of the present specification may support various communication services such as a voice call, a video call, data communication, autonomous-driving, machine-type communication (MTC), machine-to-machine (M2M), device-to-device (D2D), IoT (Internet-of-Things), etc.

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including instructions for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless LAN technology (e.g., IEEE 802.11 series). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including instructions for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless LAN technology (e.g., IEEE 802.11 series). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, an instruction and/or a set of instructions.

One or more memories 104, 204 may be connected to one or more processors 102, 202 and may store data, a signal, a message, information, a program, a code, an indication and/or an instruction in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

For example, one of the STAs 100 and 200 may perform an intended operation of an AP, and the other of the STAs 100 and 200 may perform an intended operation of a non-AP STA. For example, the transceivers 106 and 206 of FIG. 1 may perform a transmission and reception operation of a signal (e.g., a packet or a physical layer protocol data unit (PPDU) conforming to IEEE 802.11a/b/g/n/ac/ax/bc). In addition, in the present disclosure, an operation in which various STAs generate transmission/reception signals or perform data processing or calculation in advance for transmission/reception signals may be performed by the processors 102 and 202 of FIG. 1. For example, an example of an operation of generating a transmission/reception signal or performing data processing or calculation in advance for the transmission/reception signal may include 1) determining/acquiring/configuring/calculating/decoding/encoding bit information of fields (signal (SIG), short training field (STF), long training field (LTF), Data, etc.) included in the PPDU, 2) determining/configuring/acquiring time resources or frequency resources (e.g., subcarrier resources) used for fields (SIG, STF, LTF, Data, etc.) included in the PPDU; 3) determining/configuring/acquiring a specific sequence (e.g., pilot sequence, STF/LTF sequence, extra sequence applied to SIG) used for fields (SIG, STF, LTF, Data, etc.) included in the PPDU action, 4) power control operation and/or power saving operation applied to the STA, 5) Operations related to ACK signal determination/acquisition/configuration/calculation/decoding/encoding, etc. In addition, in the following example, various information (e.g., information related to fields/subfields/control fields/parameters/power, etc.) used by various STAs to determine/acquire/configure/calculate/decode/encode transmission and reception signals may be stored in the memories 104 and 204 of FIG. 1.

Hereinafter, downlink (DL) may mean a link for communication from an AP STA to a non-AP STA, and a DL PPDU/packet/signal may be transmitted and received through the DL. In DL communication, a transmitter may be part of an AP STA, and a receiver may be part of a non-AP STA. Uplink (UL) may mean a link for communication from non-AP STAs to AP STAs, and a UL PPDU/packet/signal may be transmitted and received through the UL. In UL communication, a transmitter may be part of a non-AP STA, and a receiver may be part of an AP STA.

Figure 2:
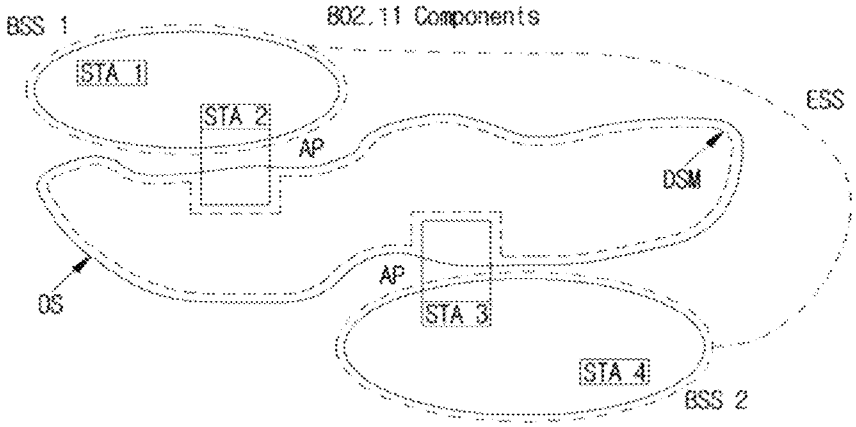
FIG. 2 is a diagram illustrating an exemplary structure of a WLAN system to which the present disclosure may be applied.

FIG. 2 is a diagram illustrating an exemplary structure of a wireless LAN system to which the present disclosure may be applied.

The structure of the wireless LAN system may consist of be composed of a plurality of components. A wireless LAN supporting STA mobility transparent to an upper layer may be provided by interaction of a plurality of components. A Basic Service Set (BSS) corresponds to a basic construction block of a wireless LAN. FIG. 2 exemplarily shows that two BSSs (BSS1 and BSS2) exist and two STAs are included as members of each BSS (STA1 and STA2 are included in BSS1, and STA3 and STA4 are included in BSS2). An ellipse representing a BSS in FIG. 2 may also be understood as representing a coverage area in which STAs included in the corresponding BSS maintain communication. This area may be referred to as a Basic Service Area (BSA). When an STA moves out of the BSA, it may not directly communicate with other STAs within the BSA.

If the DS shown in FIG. 2 is not considered, the most basic type of BSS in a wireless LAN is an independent BSS (IBSS). For example, IBSS may have a minimal form containing only two STAs. For example, assuming that other components are omitted, BSS1 containing only STA1 and STA2 or BSS2 containing only STA3 and STA4 may respectively correspond to representative examples of IBSS. This configuration is possible when STAs may communicate directly without an AP. In addition, in this type of wireless LAN, it is not configured in advance, but may be configured when a LAN is required, and this may be referred to as an ad-hoc network. Since the IBSS does not include an AP, there is no centralized management entity. That is, in IBSS, STAs are managed in a distributed manner. In IBSS, all STAs may be made up of mobile STAs, and access to the distributed system (DS) is not allowed, forming a self-contained network.

Membership of an STA in the BSS may be dynamically changed by turning on or off the STA, entering or exiting the BSS area, and the like. To become a member of the BSS, the STA may join the BSS using a synchronization process. In order to access all services of the BSS infrastructure, the STA shall be associated with the BSS. This association may be dynamically established and may include the use of a Distribution System Service (DSS).

A direct STA-to-STA distance in a wireless LAN may be limited by PHY performance. In some cases, this distance limit may be sufficient, but in some cases, communication between STAs at a longer distance may be required. A distributed system (DS) may be configured to support extended coverage.

DS means a structure in which BSSs are interconnected. Specifically, as shown in FIG. 2, a BSS may exist as an extended form of a network composed of a plurality of BSSs. DS is a logical concept and may be specified by the characteristics of Distributed System Media (DSM). In this regard, a wireless medium (WM) and a DSM may be logically separated. Each logical medium is used for a different purpose and is used by different components. These medium are not limited to being the same, nor are they limited to being different. In this way, the flexibility of the wireless LAN structure (DS structure or other network structure) may be explained in that a plurality of media are logically different. That is, the wireless LAN structure may be implemented in various ways, and the corresponding wireless LAN structure may be independently specified by the physical characteristics of each embodiment.

A DS may support a mobile device by providing seamless integration of a plurality of BSSs and providing logical services necessary to address an address to a destination. In addition, the DS may further include a component called a portal that serves as a bridge for connection between the wireless LAN and other networks (e.g., IEEE 802. X).

The AP enables access to the DS through the WM for the associated non-AP STAs, and means an entity that also has the functionality of an STA. Data movement between the BSS and the DS may be performed through the AP. For example, STA2 and STA3 shown in FIG. 2 have the functionality of STAs, and provide a function allowing the associated non-AP STAs (STA1 and STA4) to access the DS. In addition, since all APs basically correspond to STAs, all APs are addressable entities. The address used by the AP for communication on the WM and the address used by the AP for communication on the DSM are not necessarily the same. A BSS composed of an AP and one or more STAs may be referred to as an infrastructure BSS.

Data transmitted from one of the STA(s) associated with an AP to a STA address of the corresponding AP may be always received on an uncontrolled port and may be processed by an IEEE 802.1X port access entity. In addition, when a controlled port is authenticated, transmission data (or frames) may be delivered to the DS.

In addition to the structure of the DS described above, an extended service set (ESS) may be configured to provide wide coverage.

An ESS means a network in which a network having an arbitrary size and complexity is composed of DSs and BSSs. The ESS may correspond to a set of BSSs connected to one DS. However, the ESS does not include the DS. An ESS network is characterized by being seen as an IBSS in the Logical Link Control (LLC) layer. STAs included in the ESS may communicate with each other, and mobile STAs may move from one BSS to another BSS (within the same ESS) transparently to the LLC. APs included in one ESS may have the same service set identification (SSID). The SSID is distinguished from the BSSID, which is an identifier of the BSS.

The wireless LAN system does not assume anything about the relative physical locations of BSSs, and all of the following forms are possible. BSSs may partially overlap, which is a form commonly used to provide continuous coverage. In addition, BSSs may not be physically connected, and logically there is no limit on the distance between BSSs. In addition, the BSSs may be physically located in the same location, which may be used to provide redundancy. In addition, one (or more than one) IBSS or ESS networks may physically exist in the same space as one (or more than one) ESS network. When an ad-hoc network operates in a location where an ESS network exists, when physically overlapping wireless networks are configured by different organizations, or when two or more different access and security policies are required in the same location, this may correspond to the form of an ESS network in the like.

Figure 3:
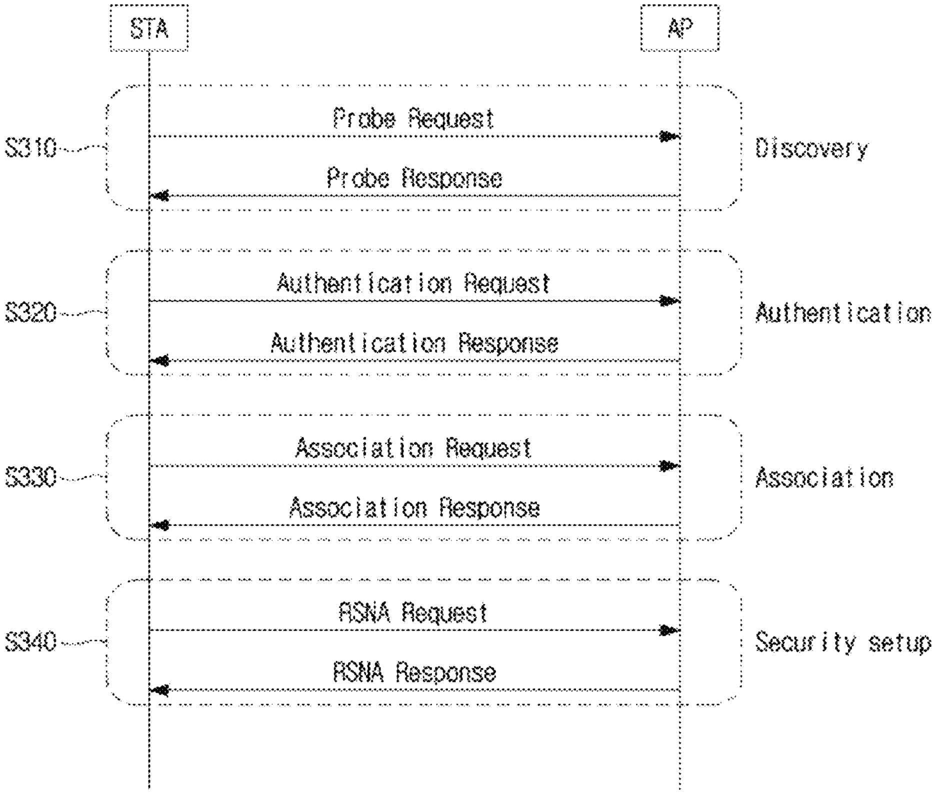
FIG. 3 is a diagram for describing a link setup process to which the present disclosure may be applied.

FIG. 3 is a diagram for explaining a link setup process to which the present disclosure may be applied.

In order for an STA to set up a link with respect to a network and transmit/receive data, it first discovers a network, performs authentication, establishes an association, and need to perform the authentication process for security. The link setup process may also be referred to as a session initiation process or a session setup process. In addition, the processes of discovery, authentication, association, and security setting of the link setup process may be collectively referred to as an association process.

In step S310, the STA may perform a network discovery operation. The network discovery operation may include a scanning operation of the STA. That is, in order for the STA to access the network, it needs to find a network in which it can participate. The STA shall identify a compatible network before participating in a wireless network, and the process of identifying a network existing in a specific area is called scanning.

Scanning schemes include active scanning and passive scanning. FIG. 3 exemplarily illustrates a network discovery operation including an active scanning process. In active scanning, an STA performing scanning transmits a probe request frame to discover which APs exist around it while moving channels and waits for a response thereto. A responder transmits a probe response frame as a response to the probe request frame to the STA that has transmitted the probe request frame. Here, the responder may be an STA that last transmitted a beacon frame in the BSS of the channel being scanned. In the BSS, since the AP transmits the beacon frame, the AP becomes a responder, and in the IBSS, the STAs in the IBSS rotate to transmit the beacon frame, so the responder is not constant. For example, a STA that transmits a probe request frame on channel 1 and receives a probe response frame on channel 1, may store BSS-related information included in the received probe response frame and may move to the next channel (e.g., channel 2) and perform scanning (i.e., transmission/reception of a probe request/response on channel 2) in the same manner.

Although not shown in FIG. 3, the scanning operation may be performed in a passive scanning manner. In passive scanning, a STA performing scanning waits for a beacon frame while moving channels. The beacon frame is one of the management frames defined in IEEE 802.11, and is periodically transmitted to notify the existence of a wireless network and to allow the STA performing scanning to find a wireless network and participate in the wireless network. In the BSS, the AP serves to transmit beacon frames periodically, and in the IBSS, STAs within the IBSS rotate to transmit beacon frames. When the STA performing scanning receives a beacon frame, the STA stores information for the BSS included in the beacon frame and records beacon frame information in each channel while moving to another channel. The STA receiving the beacon frame may store BSS-related information included in the received beacon frame, move to the next channel, and perform scanning in the next channel in the same way. Comparing active scanning and passive scanning, active scanning has an advantage of having less delay and less power consumption than passive scanning.

After the STA discovers the network, an authentication process may be performed in step S320. This authentication process may be referred to as a first authentication process in order to be clearly distinguished from the security setup operation of step S340 to be described later.

The authentication process includes a process in which the STA transmits an authentication request frame to the AP, and in response to this, the AP transmits an authentication response frame to the STA. An authentication frame used for authentication request/response corresponds to a management frame.

The authentication frame includes an authentication algorithm number, an authentication transaction sequence number, a status code, a challenge text, a robust security network (RSN), and a Finite Cyclic Group, etc. This corresponds to some examples of information that may be included in the authentication request/response frame, and may be replaced with other information or additional information may be further included.

The STA may transmit an authentication request frame to the AP. The AP may determine whether to allow authentication of the corresponding STA based on information included in the received authentication request frame. The AP may provide the result of the authentication process to the STA through an authentication response frame.

After the STA is successfully authenticated, an association process may be performed in step S330. The association process includes a process in which the STA transmits an association request frame to the AP, and in response, the AP transmits an association response frame to the STA.

For example, the association request frame may include information related to various capabilities, a beacon listen interval, a service set identifier (SSID), supported rates, supported channels, RSN, mobility domain, supported operating classes, Traffic Indication Map Broadcast request (TIM broadcast request), interworking service capability, etc. For example, the association response frame may include information related to various capabilities, status code, association ID (AID), supported rates, enhanced distributed channel access (EDCA) parameter set, received channel power indicator (RCPI), received signal to noise indicator (RSNI), mobility domain, timeout interval (e.g., association comeback time), overlapping BSS scan parameters, TIM broadcast response, Quality of Service (QoS) map, etc. This corresponds to some examples of information that may be included in the association request/response frame, and may be replaced with other information or additional information may be further included.

After the STA is successfully associated with the network, a security setup process may be performed in step S340. The security setup process of step S340 may be referred to as an authentication process through Robust Security Network Association (RSNA) request/response, and the authentication process of step S320 is referred to as a first authentication process, and the security setup process of step S340 may also simply be referred to as an authentication process.

The security setup process of step S340 may include, for example, a process of setting up a private key through 4-way handshaking through an Extensible Authentication Protocol over LAN (EAPOL) frame. In addition, the security setup process may be performed according to a security scheme not defined in the IEEE 802.11 standard.

Figure 4:
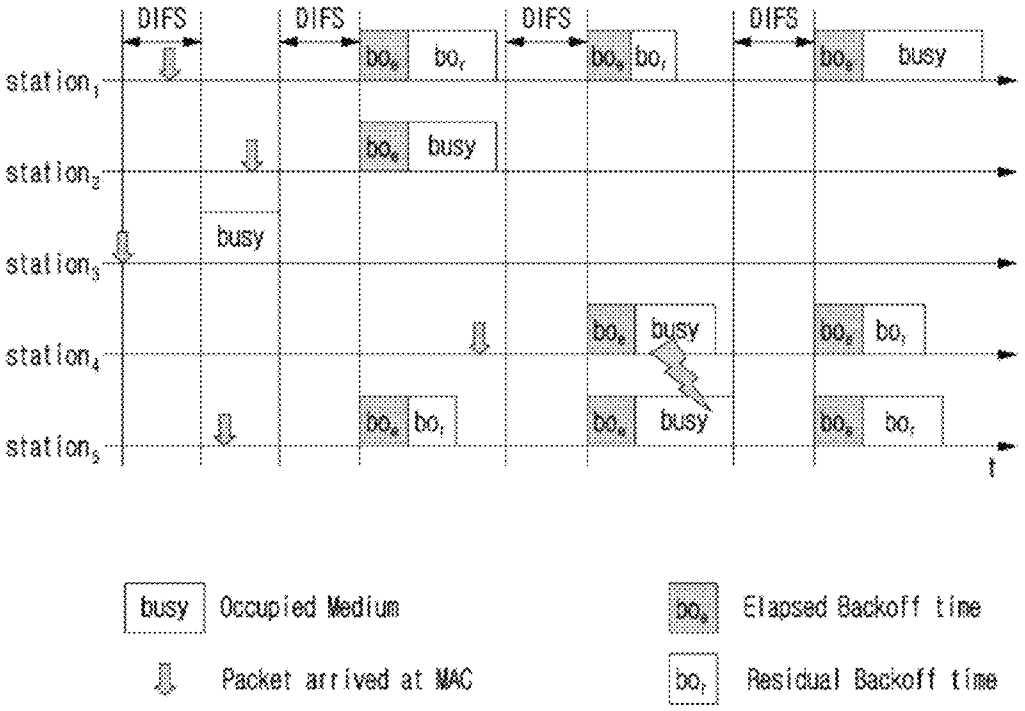
FIG. 4 is a diagram for describing a backoff process to which the present disclosure may be applied.

FIG. 4 is a diagram for explaining a backoff process to which the present disclosure may be applied.

In the wireless LAN system, a basic access mechanism of medium access control (MAC) is a carrier sense multiple access with collision avoidance (CSMA/CA) mechanism. The CSMA/CA mechanism is also called Distributed Coordination Function (DCF) of IEEE 802.11 MAC, and basically adopts a "listen before talk" access mechanism. According to this type of access mechanism, the AP and/or STA may perform Clear Channel Assessment (CCA) sensing a radio channel or medium during a predetermined time interval (e.g., DCF Inter-Frame Space (DIFS)), prior to starting transmission. As a result of the sensing, if it is determined that the medium is in an idle state, frame transmission is started through the corresponding medium. On the other hand, if it is detected that the medium is occupied or busy, the corresponding AP and/or STA does not start its own transmission and may set a delay period for medium access (e.g., a random backoff period) and attempt frame transmission after waiting. By applying the random backoff period, since it is expected that several STAs attempt frame transmission after waiting for different periods of time, collision may be minimized.

In addition, the IEEE 802.11 MAC protocol provides a Hybrid Coordination Function (HCF). HCF is based on the DCF and Point Coordination Function (PCF). PCF is a polling-based synchronous access method and refers to a method in which all receiving APs and/or STAs periodically poll to receive data frames. In addition, HCF has Enhanced Distributed Channel Access (EDCA) and HCF Controlled Channel Access (HCCA). EDCA is a contention-based access method for a provider to provide data frames to multiple users, and HCCA uses a non-contention-based channel access method using a polling mechanism. In addition, the HCF includes a medium access mechanism for improving QoS (Quality of Service) of the wireless LAN, and may transmit QoS data in both a Contention Period (CP) and a Contention Free Period (CFP).

Referring to FIG. 4, an operation based on a random backoff period will be described. When the occupied/busy medium changes to an idle state, several STAs may attempt to transmit data (or frames). As a method for minimizing collisions, each of STAs may respectively select a random backoff count and attempt transmission after waiting for a corresponding slot time. The random backoff count has a pseudo-random integer value and may be determined as one of values ranging from 0 to CW. Here, CW is a contention window parameter value. The CW parameter is given CWmin as an initial value, but may take a value twice as large in case of transmission failure (e.g., when an ACK for the transmitted frame is not received). When the CW parameter value reaches CWmax, data transmission may be attempted while maintaining the CWmax value until data transmission is successful, and when data transmission is successful, the CWmin value is reset. The values of CW, CWmin and CWmax are preferably set to $2^n-1$ (n=0, 1, 2, . . . ).

When the random backoff process starts, the STA continuously monitors the medium while counting down the backoff slots according to the determined backoff count value. When the medium is monitored for occupancy, it stops counting down and waits, and resumes the rest of the countdown when the medium becomes idle.

In the example of FIG. 4, when a packet to be transmitted arrives at the MAC of STA3, STA3 may transmit the frame immediately after confirming that the medium is idle as much as DIFS. The remaining STAs monitor and wait for the medium to be occupied/busy. In the meantime, data to be transmitted may also occur in each of STA1, STA2, and STA5, and each STA waits as long as DIFS when the medium is monitored as idle, and then may perform a countdown of the backoff slot according to the random backoff count value selected by each STA. Assume that STA2 selects the smallest backoff count value and STA1 selects the largest backoff count value. That is, the case where the remaining back-off time of STA5 is shorter than the remaining back-off time of STA1 at the time when STA2 completes the back-off count and starts frame transmission is exemplified. STA1 and STA5 temporarily stop counting down and wait while STA2 occupies the medium. When the occupation of STA2 ends and the medium becomes idle again, STA1 and STA5 wait for DIFS and resume the stopped backoff count. That is, frame transmission may be started after counting down the remaining backoff slots for the remaining backoff time. Since the remaining backoff time of STA5 is shorter than that of STA1, STA5 starts frame transmission. While STA2 occupies the medium, data to be transmitted may also occur in STA4. From the standpoint of STA4, when the medium becomes idle, STA4 may wait for DIFS, and then may perform a countdown according to the random backoff count value selected by the STA4 and start transmitting frames. The example of FIG. 4 shows a case where the remaining backoff time of STA5 coincides with the random backoff count value of STA4 by chance. In this case, a collision may occur between STA4 and STA5. When a collision occurs, both STA4 and STA5 do not receive an ACK, so data transmission fails. In this case, STA4 and STA5 may double the CW value, select a random backoff count value, and perform a countdown. STA1 waits while the medium is occupied due to transmission of STA4 and STA5, waits for DIFS when the medium becomes idle, and then starts frame transmission after the remaining backoff time has elapsed.

As in the example of FIG. 4, the data frame is a frame used for transmission of data forwarded to a higher layer, and may be transmitted after a backoff performed after DIFS elapses from when the medium becomes idle. Additionally, the management frame is a frame used for exchange of management information that is not forwarded to a higher layer, and is transmitted after a backoff performed after an IFS such as DIFS or Point Coordination Function IFS (PIFS). As a subtype frames of management frame, there are a Beacon, an association request/response, a re-association request/response, a probe request/response, an authentication request/response, etc. A control frame is a frame used to control access to a medium. As a subtype frames of control frame, there are Request-To-Send (RTS), Clear-To-Send (CTS), Acknowledgement (ACK), Power Save-Poll (PS-Poll), block ACK (BlockAck), block ACK request (BlockACKReq), null data packet announcement (NDP announcement), and trigger, etc. If the control frame is not a response frame of the previous frame, it is transmitted after backoff performed after DIFS elapses, and if it is a response frame of the previous frame, it is transmitted without performing backoff after short IFS (SIFS) elapses. The type and subtype of the frame may be identified by a type field and a subtype field in a frame control (FC) field.

A Quality of Service (QoS) STA may perform the backoff that is performed after an arbitration IFS (AIFS) for an access category (AC) to which the frame belongs, that is, AIFS[i] (where i is a value determined by AC), and then may transmit the frame. Here, the frame in which AIFS[i] can be used may be a data frame, a management frame, or a control frame other than a response frame.

Figure 5:
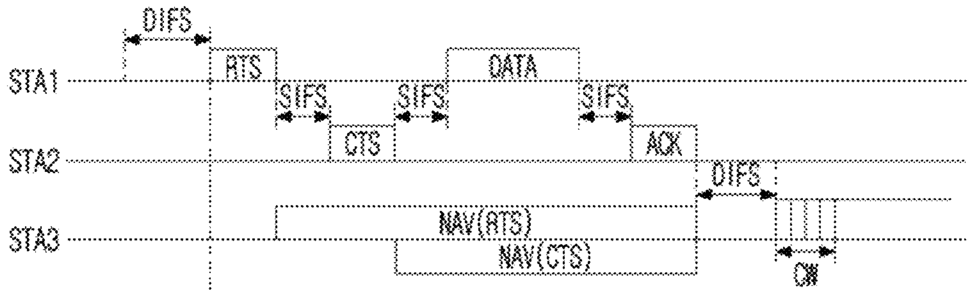
FIG. 5 is a diagram for describing a frame transmission operation based on CSMA/CA to which the present disclosure may be applied.

FIG. 5 is a diagram for explaining a frame transmission operation based on CSMA/CA to which the present disclosure may be applied.

As described above, the CSMA/CA mechanism includes virtual carrier sensing in addition to physical carrier sensing in which a STA directly senses a medium. Virtual carrier sensing is intended to compensate for problems that may occur in medium access, such as a hidden node problem. For virtual carrier sensing, the MAC of the STA may use a Network Allocation Vector (NAV). The NAV is a value indicating, to other STAs, the remaining time until the medium is available for use by an STA currently using or having the right to use the medium. Therefore, the value set as NAV corresponds to a period in which the medium is scheduled to be used by the STA transmitting the frame, and the STA receiving the NAV value is prohibited from accessing the medium during the corresponding period. For example, the NAV may be configured based on the value of the "duration" field of the MAC header of the frame.

In the example of FIG. 5, it is assumed that a STA1 intends to transmit data to a STA2, and a STA3 is in a position capable of overhearing some or all of frames transmitted and received between the STA1 and the STA2.

In order to reduce the possibility of collision of transmissions of multiple STAs in CSMA/CA based frame transmission operation, a mechanism using RTS/CTS frames may be applied. In the example of FIG. 5, while transmission of the STA1 is being performed, as a result of carrier sensing of the STA3, it may be determined that the medium is in an idle state. That is, the STA1 may correspond to a hidden node to the STA3. Alternatively, in the example of FIG. 5, it may be determined that the carrier sensing result medium of the STA3 is in an idle state while transmission of the STA2 is being performed. That is, the STA2 may correspond to a hidden node to the STA3. Through the exchange of RTS/CTS frames before performing data transmission and reception between the STA1 and the STA2, a STA outside the transmission range of one of the STA1 or the STA2, or a STA outside the carrier sensing range for transmission from the STA1 or the STA3 may not attempt to occupy the channel during data transmission and reception between the STA1 and the STA2.

Specifically, the STA1 may determine whether a channel is being used through carrier sensing. In terms of physical carrier sensing, the STA1 may determine a channel occupation idle state based on an energy level or signal correlation detected in a channel. In addition, in terms of virtual carrier sensing, the STA1 may determine a channel occupancy state using a network allocation vector (NAV) timer.

The STA1 may transmit an RTS frame to the STA2 after performing a backoff when the channel is in an idle state during DIFS. When the STA2 receives the RTS frame, the STA2 may transmit a CTS frame as a response to the RTS frame to the STA1 after SIFS.

If the STA3 cannot overhear the CTS frame from the STA2 but can overhear the RTS frame from the STA1, the STA3 may set a NAV timer for a frame transmission period (e.g., SIFS+CTS frame+SIFS+data frame+SIFS+ACK frame) that is continuously transmitted thereafter, using the duration information included in the RTS frame. Alternatively, if the STA3 can overhear a CTS frame from the STA2 although the STA3 cannot overhear an RTS frame from the STA1, the STA3 may set a NAV timer for a frame transmission period (e.g., SIFS+data frame+SIFS+ACK frame) that is continuously transmitted thereafter, using the duration information included in the CTS frame. That is, if the STA3 can overhear one or more of the RTS or CTS frames from one or more of the STA1 or the STA2, the STA3 may set the NAV accordingly. When the STA3 receives a new frame before the NAV timer expires, the STA3 may update the NAV timer using duration information included in the new frame. The STA3 does not attempt channel access until the NAV timer expires.

When the STA1 receives the CTS frame from the STA2, the STA1 may transmit the data frame to the STA2 after SIFS from the time point when the reception of the CTS frame is completed. When the STA2 successfully receives the data frame, the STA2 may transmit an ACK frame as a response to the data frame to the STA1 after SIFS. The STA3 may determine whether the channel is being used through carrier sensing when the NAV timer expires. When the STA3 determines that the channel is not used by other terminals during DIFS after expiration of the NAV timer, the STA3 may attempt channel access after a contention window (CW) according to a random backoff has passed.

Figure 6:
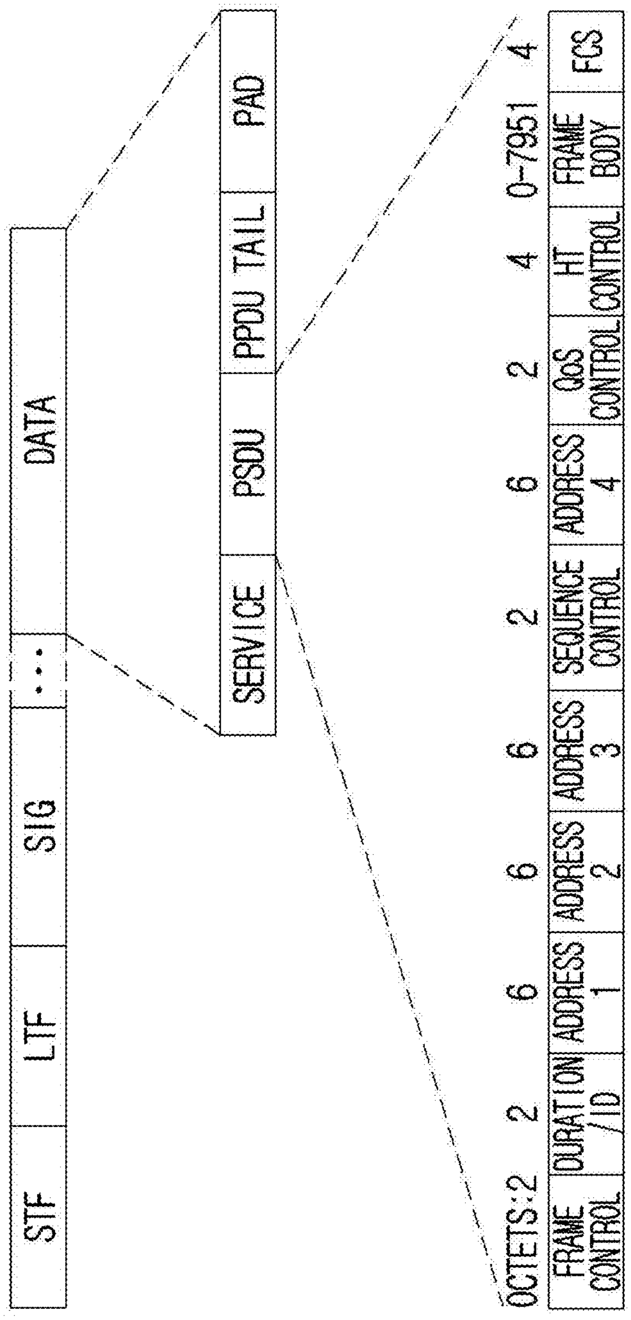
FIG. 6 is a diagram for describing an example of a frame structure used in a WLAN system to which the present disclosure may be applied.

FIG. 6 is a diagram for explaining an example of a frame structure used in a WLAN system to which the present disclosure may be applied.

By means of an instruction or primitive (meaning a set of instructions or parameters) from the MAC layer, the PHY layer may prepare a MAC PDU (MPDU) to be transmitted. For example, when a command requesting transmission start of the PHY layer is received from the MAC layer, the PHY layer switches to the transmission mode and configures information (e.g., data) provided from the MAC layer in the form of a frame and transmits it. In addition, when the PHY layer detects a valid preamble of the received frame, the PHY layer monitors the header of the preamble and sends a command notifying the start of reception of the PHY layer to the MAC layer.

In this way, information transmission/reception in a wireless LAN system is performed in the form of a frame, and for this purpose, a PHY layer protocol data unit (PPDU) frame format is defined.

A basic PPDU may include a Short Training Field (STF), Long Training Field (LTF), SIGNAL (SIG) field, and Data (Data) field. The most basic PPDU format (e.g., non-HT (High Throughput) shown in FIG. 7) may consist of only the Legacy-STF (L-STF), Legacy-LTF (L-LTF), Legacy-SIG (L-SIG) fields, and data fields. Additionally, depending on the type of PPDU format (e.g., HT-mixed format PPDU, HT-greenfield format PPDU, VHT (Very High Throughput) PPDU, etc.), additional (or different types) of RL-SIG, U-SIG, non-legacy SIG fields, non-legacy STF, non-legacy LTF (i.e., xx-SIG, xx-STF, xx-LTF (e.g. xx is HT, VHT, HE, EHT, etc.)), etc. may be included between the L-SIG field and the data field.

The STF is a signal for signal detection, automatic gain control (AGC), diversity selection, precise time synchronization, and the like, and the LTF is a signal for channel estimation and frequency error estimation. The STF and LTF may be referred to as signals for synchronization and channel estimation of the OFDM physical layer.

The SIG field may include various information related to PPDU transmission and reception. For example, the L-SIG field consists of 24 bits and the L-SIG field may include 4-bit Rate field, 1-bit Reserved bit, 12-bit Length field, 1-bit Parity field, and 6-bit Tail field. The RATE field may include information about the modulation and coding rate of data. For example, the 12-bit Length field may include information about the length or time duration of the PPDU. For example, the value of the 12-bit Length field may be determined based on the type of PPDU. For example, for non-HT, HT, VHT, or EHT PPDU, the value of the Length field may be determined to be a multiple of 3. For example, for a HE PPDU, the value of the Length field may be determined as a multiple of 3+1 or a multiple of 3+2.

The data field may include a SERVICE field, a physical layer service data unit (PSDU), and a PPDU TAIL bit, and may also include padding bits if necessary. Some bits of the SERVICE field may be used for synchronization of the descrambler at the receiving end. The PSDU corresponds to the MAC PDU defined in the MAC layer, and may include data generated/used in the upper layer. The PPDU TAIL bit may be used to return the encoder to a 0 state. Padding bits may be used to adjust the length of a data field in a predetermined unit.

A MAC PDU is defined according to various MAC frame formats, and a basic MAC frame consists of a MAC header, a frame body, and a Frame Check Sequence (FCS). The MAC frame may consist of MAC PDUs and be transmitted/received through the PSDU of the data part of the PPDU frame format.

The MAC header includes a Frame Control field, a Duration/ID field, an Address field, and the like. The frame control field may include control information required for frame transmission/reception. The duration/ID field may be set to a time for transmitting a corresponding frame or the like. For details of the Sequence Control, QoS Control, and HT Control subfields of the MAC header, refer to the IEEE 802.11 standard document.

The null-data PPDU (NDP) format refers to a PPDU format that does not include a data field. In other words, NDP refers to a frame format that includes the PPDU preamble in a general PPDU format (i.e., L-STF, L-LTF, L-SIG fields, and additionally non-legacy SIG, non-legacy STF, non-legacy LTF if present) and does not include the remaining part (i.e., data field).

Figure 7:
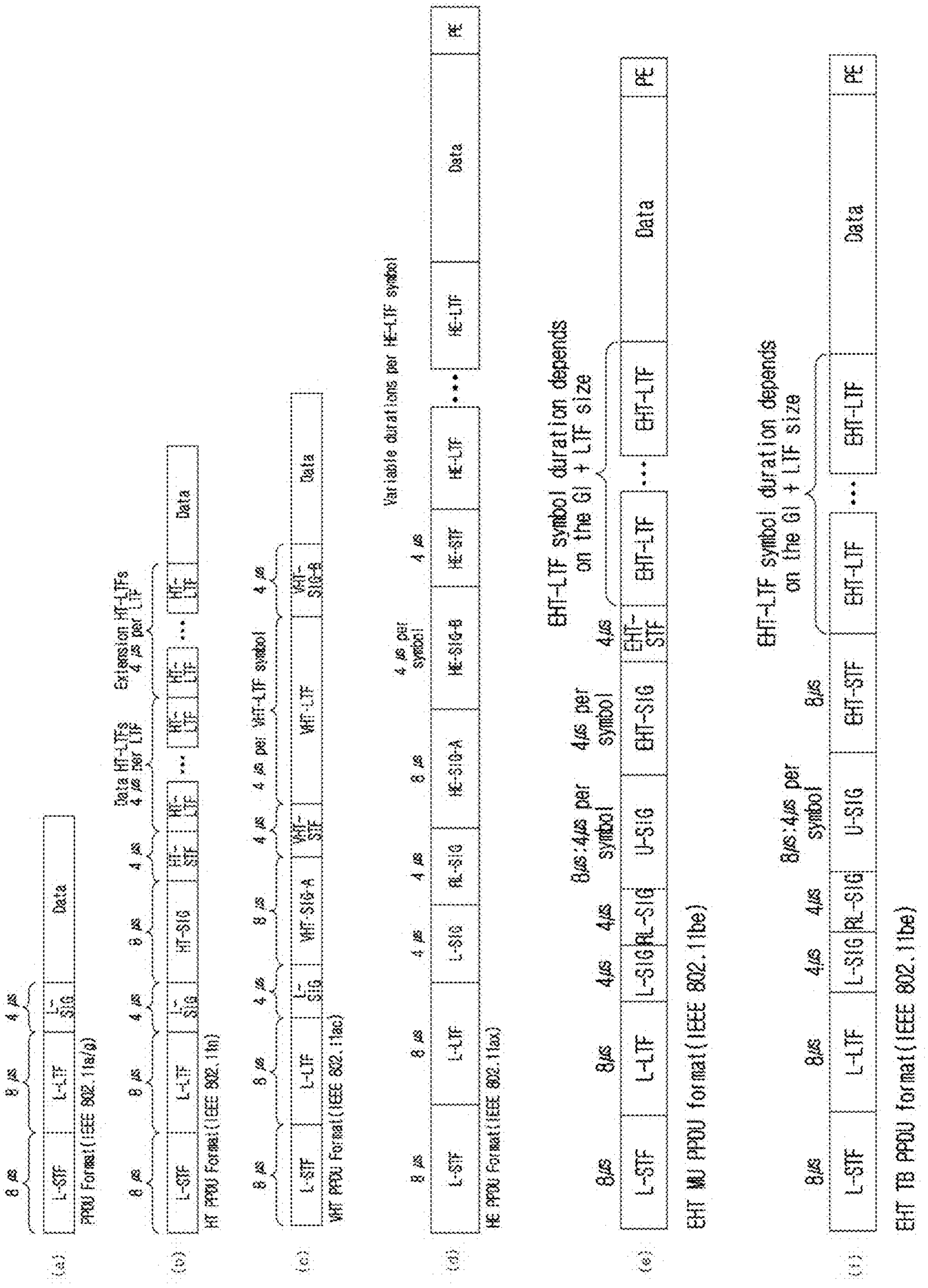
FIG. 7 is a diagram illustrating examples of PPDUs defined in the IEEE 802.11 standard to which the present disclosure may be applied.

FIG. 7 is a diagram illustrating examples of PPDUs defined in the IEEE 802.11 standard to which the present disclosure may be applied.

In standards such as IEEE 802.11a/g/n/ac/ax, various types of PPDUs have been used. The basic PPDU format (IEEE 802.11a/g) includes L-LTF, L-STF, L-SIG and Data fields. The basic PPDU format may also be referred to as a non-HT PPDU format (as shown in FIG. 7(*a*)).

The HT PPDU format (IEEE 802.11n) additionally includes HT-SIG, HT-STF, and HT-LFT(s) fields to the basic PPDU format. The HT PPDU format shown in FIG. 7(*b*) may be referred to as an HT-mixed format. In addition, an HT-greenfield format PPDU may be defined, and this corresponds to a format consisting of HT-GF-STF, HT-LTF1, HT-SIG, one or more HT-LTF, and Data field, not including L-STF, L-LTF, and L-SIG (not shown).

An example of the VHT PPDU format (IEEE 802.11ac) additionally includes VHT SIG-A, VHT-STF, VHT-LTF, and VHT-SIG-B fields to the basic PPDU format (as shown in FIG. 7(*c*)).

An example of the HE PPDU format (IEEE 802.11ax) additionally includes Repeated L-SIG (RL-SIG), HE-SIG-A, HE-SIG-B, HE-STF, HE-LTF(s), Packet Extension (PE) field to the basic PPDU format (as shown in FIG. 7(*d*)). Some fields may be excluded or their length may vary according to detailed examples of the HE PPDU format. For example, the HE-SIG-B field is included in the HE PPDU format for multi-user (MU), and the HE-SIG-B is not included in the HE PPDU format for single user (SU). In addition, the HE trigger-based (TB) PPDU format does not include the HE-SIG-B, and the length of the HE-STF field may vary to 8 us. The Extended Range (HE ER) SU PPDU format does not include the HE-SIG-B field, and the length of the HE-SIG-A field may vary to 16 us. For example, RL-SIG may be configured the same as L-SIG. The receiving STA can know that the received PPDU is a HE PPDU or an EHT PPDU, which will be described later, based on the presence of the RL-SIG.

The EHT PPDU format may include the EHT MU (multi-user) in FIG. 7(*e*) and the EHT TB (trigger-based) PPDU in FIG. 7(*f*). The EHT PPDU format is similar to the HE PPDU format in that it includes RL-SIG followed by L-SIG, but may include U (universal)-SIG, EHT-SIG, EHT-STF, and EHT-LTF following RL-SIG.

The EHT MU PPDU in FIG. 7(*e*) corresponds to a PPDU carrying one or more data (or PSDU) for one or more users. That is, the EHT MU PPDU may be used for both SU transmission and MU transmission. For example, the EHT MU PPDU may correspond to a PPDU for one receiving STA or multiple receiving STAs.

The EHT TB PPDU in FIG. 7(*f*) omits the EHT-SIG compared to the EHT MU PPDU. An STA that receives a trigger (e.g., trigger frame or triggered response scheduling (TRS)) for UL MU transmission may perform UL transmission based on the EHT TB PPDU format.

L-STF, L-LTF, L-SIG, RL-SIG, U-SIG (Universal SIGNAL), EHT-SIG fields may be encoded and modulated so that even legacy STAs may attempt demodulation and decoding, and may be mapped based on a determined subcarrier frequency interval (e.g., 312.5 kHz). These may be referred to as pre-EHT modulated fields. Next, the EHT-STF, EHT-LTF, Data, PE fields may be encoded and modulated to be demodulated and decoded by an STA that successfully decodes the non-legacy SIG (e.g., U-SIG and/or EHT-SIG) and obtains the information included in the field, and may be mapped based on a determined subcarrier frequency interval (e.g., 78.125 kHz). These may be referred to as EHT modulated fields.

Similarly, in the HE PPDU format, the L-STF, L-LTF, L-SIG, RL-SIG, HE-SIG-A, and HE-SIG-B fields may be referred to as pre-HE modulation fields, and the HE-STF, HE-LTF, Data, and PE fields may be referred to as HE modulation fields. Additionally, in the VHT PPDU format, the L-STF, L-LTF, L-SIG, and VHT-SIG-A fields may be referred to as free VHT modulation fields, and VHT STF, VHT-LTF, VHT-SIG-B, and Data fields may be referred to as VHT modulation fields.

The U-SIG included in the EHT PPDU format of FIG. 7 may be configured based on, for example, two symbols (e.g., two consecutive OFDM symbols). Each symbol (e.g., OFDM symbol) for U-SIG may have a duration of 4 us, and U-SIG may have a total duration of 8 us. Each symbol of U-SIG may be used to transmit 26 bits of information. For example, each symbol of U-SIG can be transmitted and received based on 52 data tones and 4 pilot tones.

U-SIG may be constructed in units of 20 MHz. For example, if an 80 MHz PPDU is constructed, the U-SIG may be duplicated. That is, the same 4 U-SIGs may be included in the 80 MHz PPDU. PPDUs exceeding 80 MHz bandwidth may include different U-SIGs.

For example, A number of uncoded bits may be transmitted through U-SIG, the first symbol of U-SIG (e.g., U-SIG-1 symbol) may transmit the first X bits of information out of the total A bits of information, and the second symbol of U-SIG (e.g., U-SIG-2 symbol) may transmit the remaining Y bit information of the total A bit information. A-bit information (e.g., 52 uncoded bits) may include a CRC field (e.g., a 4-bit long field) and a tail field (e.g., a 6-bit long field). For example, the tail field may be used to terminate the trellis of the convolutional decoder and may be set to 0.

A bit information transmitted by U-SIG may be divided into version-independent bits and version-dependent bits. For example, U-SIG may be included in a new PPDU format not shown in FIG. 7 (e.g., UHR PPDU format), and in the format of the U-SIG field included in the EHT PPDU format and the format of the U-SIG field included in the UHR PPDU format, version-independent bits may be the same, and some or all of the version-dependent bits may be different.

For example, the size of the version-independent bits of U-SIG may be fixed or variable. Version-independent bits may be assigned only to the U-SIG-1 symbol, or to both the U-SIG-1 symbol and the U-SIG-2 symbol. Version-independent bits and version-dependent bits may be called various names, such as first control bit and second control bit.

For example, the version-independent bits of U-SIG may include a 3-bit physical layer version identifier (PHY version identifier), and this information may indicate the PHY version (e.g., EHT, UHR, etc.) of the transmitted/received PPDU. The version-independent bits of U-SIG may include a 1-bit UL/DL flag field. The first value of the 1-bit UL/DL flag field is related to UL communication, and the second value of the UL/DL flag field is related to DL communication. The version-independent bits of U-SIG may include information about the length of transmission opportunity (TXOP) and information about the BSS color ID.

For example, the version-dependent bits of U-SIG may include information directly or indirectly indicating the type of PPDU (e.g., SU PPDU, MU PPDU, TB PPDU, etc.).

Information necessary for PPDU transmission and reception may be included in U-SIG. For example, U-SIG may further include information about whether information on bandwidth, information on the MCS technique applied to the non-legacy SIG (e.g., EHT-SIG or UHR-SIG, etc.), information indicating whether the DCM (dual carrier modulation) technique (e.g., a technique to achieve an effect similar to frequency diversity by reusing the same signal on two subcarriers) is applied to the non-legacy SIG, information on the number of symbols used for the non-legacy SIG, non-legacy SIG is generated across the entire band.

Some of the information required for PPDU transmission and reception may be included in U-SIG and/or non-legacy SIG (e.g., EHT-SIG or UHR-SIG, etc.). For example, information on the type of non-legacy LTF/STF (e.g., EHT-LTF/EHT-STF or UHR-LTF/UHR-STF, etc.), information on the length of the non-legacy LTF and CP (cyclic prefix) length, information on GI (guard interval) applicable to non-legacy LTF, information on preamble puncturing applicable to PPDU, information on RU (resource unit) allocation, etc. may be included only in the U-SIG, only in the non-legacy SIG, or may be indicated by a combination of information included in the U-SIG and information included in the non-legacy SIG.

Preamble puncturing may mean transmission of a PPDU in which a signal does not exist in one or more frequency units among the bandwidth of the PPDU. For example, the size of the frequency unit (or resolution of preamble puncturing) may be defined as 20 MHz, 40 MHz, etc. For example, preamble puncturing may be applied to a PPDU bandwidth of a predetermined size or more.

In the example of FIG. 7, non-legacy SIGs such as HE-SIG-B and EHT-SIG may include control information for the receiving STA. A non-legacy SIG may be transmitted over at least one symbol, and one symbol may have a length of 4 us. Information about the number of symbols used for the EHT-SIG may be included in previous SIGs (e.g., HE-SIG-A, U-SIG, etc.).

Non-legacy SIGs such as HE-SIG-B and EHT-SIG may include common fields and user-specific fields. Common fields and user-specific fields may be coded separately.

In some cases, common fields may be omitted. For example, in a compression mode where non-OFDMA (orthogonal frequency multiple access) is applied, the common field may be omitted, and multiple STAs may receive a PPDU (e.g., a data field of the PPDU) through the same frequency band. In a non-compressed mode where OFDMA is applied, multiple users may receive a PPDU (e.g., a data field of the PPDU) through different frequency bands.

The number of user-specific fields may be determined based on the number of users. One user block field may include up to two user fields. Each user field may be associated with a MU-MIMO allocation or may be associated with a non-MU-MIMO allocation.

The common field may include a CRC bit and a Tail bit, and the length of the CRC bit may be determined to be 4 bits, and the length of the Tail bit may be determined to be 6 bits and set to 000000. The common field may include RU allocation information. RU allocation information may include information about the location of the RU to which multiple users (i.e., multiple receiving STAs) are assigned.

RU may include multiple subcarriers (or tones). RU may be used when transmitting signals to multiple STAs based on OFDMA technique. Additionally, RU may be defined even when transmitting a signal to one STA. Resources may be allocated in RU units for non-legacy STF, non-legacy LTF, and Data fields.

An RU of applicable size may be defined according to the PPDU bandwidth. RU may be defined identically or differently for the applied PPDU format (e.g., HE PPDU, EHT PPDU, UHR PPDU, etc.). For example, in the case of 80 MHz PPDU, the RU placement of HE PPDU and EHT PPDU may be different. Applicable RU size, number of RU, and RU location for each PPDU bandwidth, DC (direct current) subcarrier location and number, null subcarrier location and number, guard subcarrier location and number, etc. may be referred to as a tone-plan. For example, a tone-plan for high bandwidth may be defined in the form of multiple iterations of a low-bandwidth tone-plan.

RUs of various sizes may be defined as 26-tone RU, 52-tone RU, 106-tone RU, 242-tone RU, 484-tone RU, 996-tone RU, 2×996-tone RU, 3×996-tone RU, etc. MRU (multiple RU) is distinguished from a plurality of individual RUs and corresponds to a group of subcarriers composed of a plurality of RUs. For example, one MRU may be defined as 52+26-tone, 106+26-tone, 484+242-tone, 996+484-tone, 996+484+242-tone, 2×996+484-tone, 3×996-tone, or 3×996+484-tone. Additionally, a plurality of RUs constituting one MRU may or may not be continuous in the frequency domain.

The specific size of the RU may be reduced or expanded. Accordingly, the specific size of each RU (i.e., the number of corresponding tones) in the present disclosure is not limiting and is illustrative. Additionally, in the present disclosure, within a predetermined bandwidth (e.g., 20, 40, 80, 160, 320 MHz, . . . ), the number of RUs may vary depending on the RU size.

The names of each field in the PPDU formats of FIG. 7 are exemplary, and the scope of the present disclosure is not limited by the names. In addition, examples of the present disclosure may be applied to the PPDU format illustrated in FIG. 7 as well as to a new PPDU format in which some fields are excluded and/or some fields are added based on the PPDU formats of FIG. 7.

Multi-link Operation

Hereinafter, the multi-link (ML) operation supported by the STA according to the present disclosure is described.

The STA (AP STA and/or non-AP STA) described in the present disclosure may support multi-link (ML) communication. ML communication may refer to communication supporting multiple links. Links related to ML communication may include channels (e.g., 20/40/80/160/240/320 MHz channels) of a frequency band (e.g., 2.4 GHz band, 5 GHz band, 6 GHz band, etc.) in which the STA operates. The multiple links used for ML communication may be configured in various ways. For example, the multiple links supported for one STA for ML communication may belong to the same frequency band or may belong to different frequency bands. In addition, each link may correspond to a frequency unit of a predetermined size (e.g., a channel, a subchannel, an RU, etc.). In addition, some or all of the multiple links may be frequency units of the same size or may be frequency units of different sizes.

When one STA supports multiple links, the transmitting and receiving devices supporting each link may operate as one logical STA. That is, an MLD refers to a device that has one or more affiliated STAs as a logical entity and a single MAC service access point (SAP) for one MAC data service and logical link control (LLC). A non-AP MLD refers to an MLD in which each STA affiliated with the MLD is a non-AP STA. A multi-radio non-AP MLD refers to a non-AP MLD that supports receiving or exchanging frames on more than one link at a time. An AP MLD refers to an MLD in which each STA affiliated with the MLD is an AP STA.

Multi-link operation (MLO) may enable a non-AP MLD to discover, authenticate, associate, and set up multiple links with an AP MLD. Based on the supported capabilities exchanged during the association procedure, each link may enable channel access and frame exchange between the non-AP MLD and the AP MLD. An STA affiliated with an MLD can select and manage its capabilities and operating parameters independently from other STA(s) affiliated with the same MLD.

Through the multi-link setup process, the AP MLD and/or the non-AP MLD may transmit and receive link-related information that the MLD can support. The link-related information may include one or more of information about whether the MLD supports simultaneous transmit and receive (STR) operation or non-simultaneous transmit and receive (NSTR) operation, which allows simultaneous transmission and reception on multiple links, information about the number/upper limit of UL/DL links, information about the location/bandwidth/resources of UL/DL links, information about frame types (e.g., management, control, data, etc.) that are available or preferred on at least one UL/DL link, information about an ACK policy that is available or preferred on at least one UL/DL link, or information about a traffic identifier (TID) that is available on at least one UL/DL link.

An AP MLD (e.g., NSTR mobile AP MLD) may set one link among multiple links as a primary link. The AP MLD may transmit beacon frames, probe response frames, and group-addressed data frames only on the primary link. The remaining link(s) of the multiple links may be referred to as non-primary links. An AP MLD operating on a non-primary link may operate so as not to transmit beacon frames or probe response frames. In addition, a non-AP MLD may perform frame exchanges during authentication, (re)association, and 4-way handshaking only on the primary link.

A setup link is defined as enabled if at least one traffic identifier (TID) is mapped to the link through the multi-link setup process, and a setup link may be defined as disabled if no TID is mapped to the link. A TID must always be mapped to at least one setup link unless admission control is used. By default, a TID is mapped to all setup links, so all setup links can be enabled.

When a link is enabled, the link may be used for frame exchange depending on the power state of the non-AP STA operating on the link. Only MSDUs or A-MSDUs with a TID mapped to the enabled link can be transmitted on the link. Management frames and control frames may only be transmitted on the enabled link.

When a link is disabled, the link may not be used for frame exchange, including management frames for both DL and UL.

During the multi-link setup process, enabling/disabling of each link may be indicated through TID-to-Link mapping. TID-to-Link mapping may be performed in default mapping mode or/and negotiation mapping mode.

One of the STAs affiliated with the MLD may provide information about one or more links other than the link on which it is located, for multi-link discovery (e.g., obtaining information about multiple links including the corresponding link on one link) or multi-link setup (e.g., simultaneously associating on multiple links through exchange of association request/response frames on one link). A multi-link (ML) element may be defined to provide such information.

Figure 8:
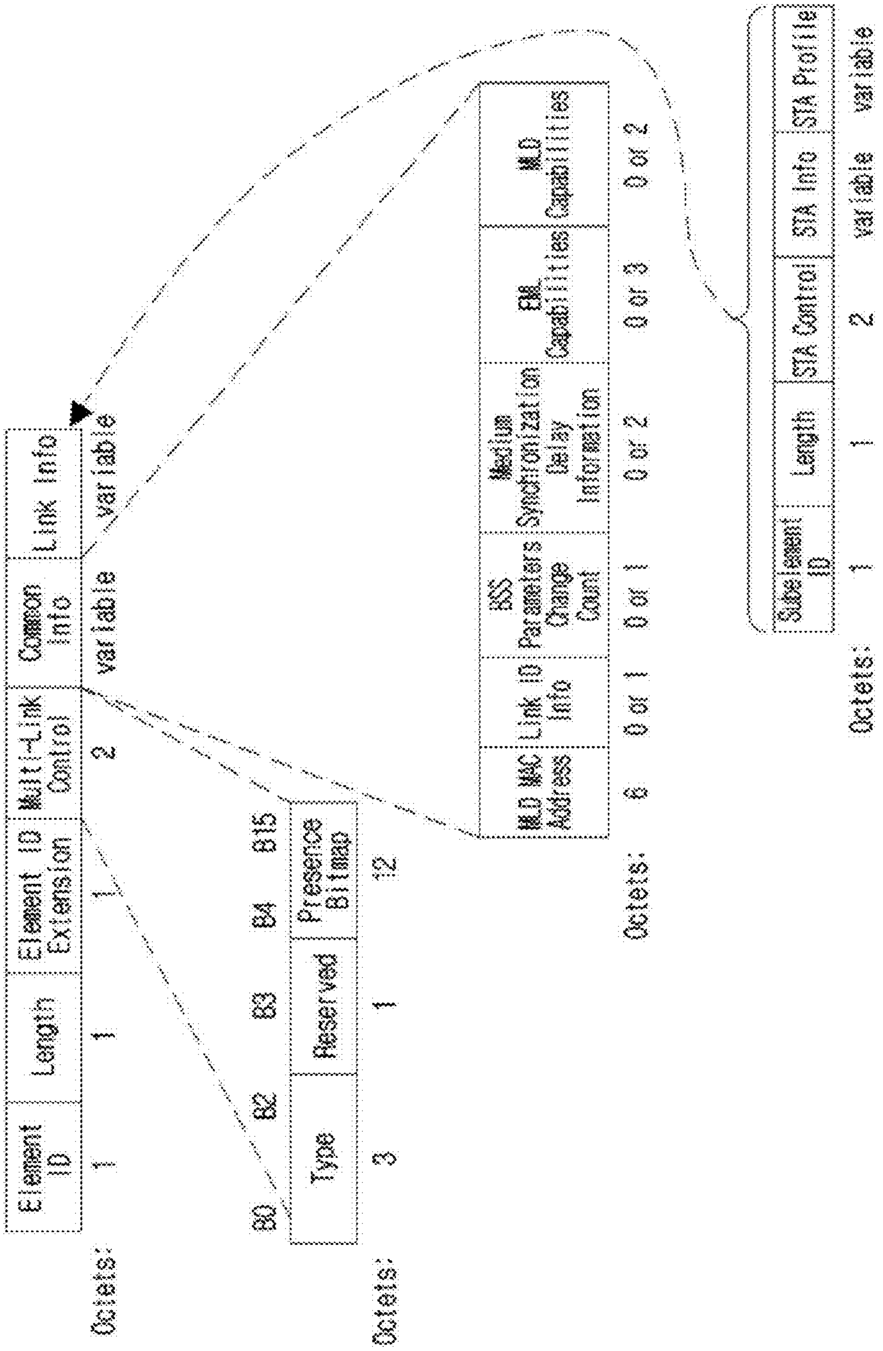
FIG. 8 illustrates an exemplary structure of an ML element to which the present disclosure may be applied.

FIG. 8 exemplarily shows the structure of an ML element to which the present disclosure may be applied.

In the ML element, the element ID field and the element ID extension field may have specific values (e.g., 255 and 107) indicating that it is an ML element, and the length field may have a value indicating the length (e.g., in octet units) of the remaining fields excluding the element ID field and the length field.

The multi-link control field is defined as 2 octets in size and may include a 3-bit type subfield, a 1-bit reserved bit, and a 12-bit presence bitmap subfield. The type subfield may have a value indicating one of the following types: basic, probe request, reconfiguration, tunneled direct-link setup (TDLS), and priority access. The presence bitmap subfield indicates the presence or absence of various subfield(s) within the common info field, and may be defined in different formats depending on the various variants (or types) of the ML element.

The common info field is defined to be of variable size and may include a 6-octet MLD MAC address subfield, which may have a value specifying the MAC address of the MLD to which the STA transmitting the basic ML element belongs. In addition, a link ID info subfield, a BSS parameter change count subfield, a medium synchronization delay information subfield, an enhanced multi-link (EML) capability subfield, an MLD capability subfield, etc. may or may not be included in the common info field.

The link info field is defined to be variable in size, may include link-specific information, and may be optionally present. When the link info field is present, it may include one or more subelements. The format and order of the subelements may be defined in various ways. As an example of an optional subelement ID for a basic variant ML element, the value 0 of the subelement ID corresponds to the name of the per-STA profile and is extensible, the value 221 corresponds to the name of the vendor-specific name and whether it is extensible can be determined by the vendor, and the remaining values 1-220 and 222-255 may be reserved.

The STA-per-profile subfield may include a 1-octet subelement ID subfield, a 1-octet length subfield, a 2-octet STA control subfield, a variable-sized STA info subfield, and a variable-sized STA profile subfield. The STA control subfield may include information such as a link ID, whether a complete profile is included, whether an STA MAC address exists, etc. The STA info subfield may include information such as an STA MAC address. The STA profile subfield may include information included in a probe response or probe request frame body, information included in a (re)association response or (re)association request frame body, etc., depending on whether the reported STA is an AP STA or a non-AP STA.

The format of the ML element in FIG. 8 is exemplary, and the order, name, size, etc. of the fields/subfields may be changed, additional fields/subfields may be further defined, and some fields/subfields may be excluded. In short, the common information field includes common information between STAs in the MLD, and the link information field may include specific information for each STA/link (e.g., in a per-STA profile subelement including a link ID corresponding to the STA).

Figure 9:
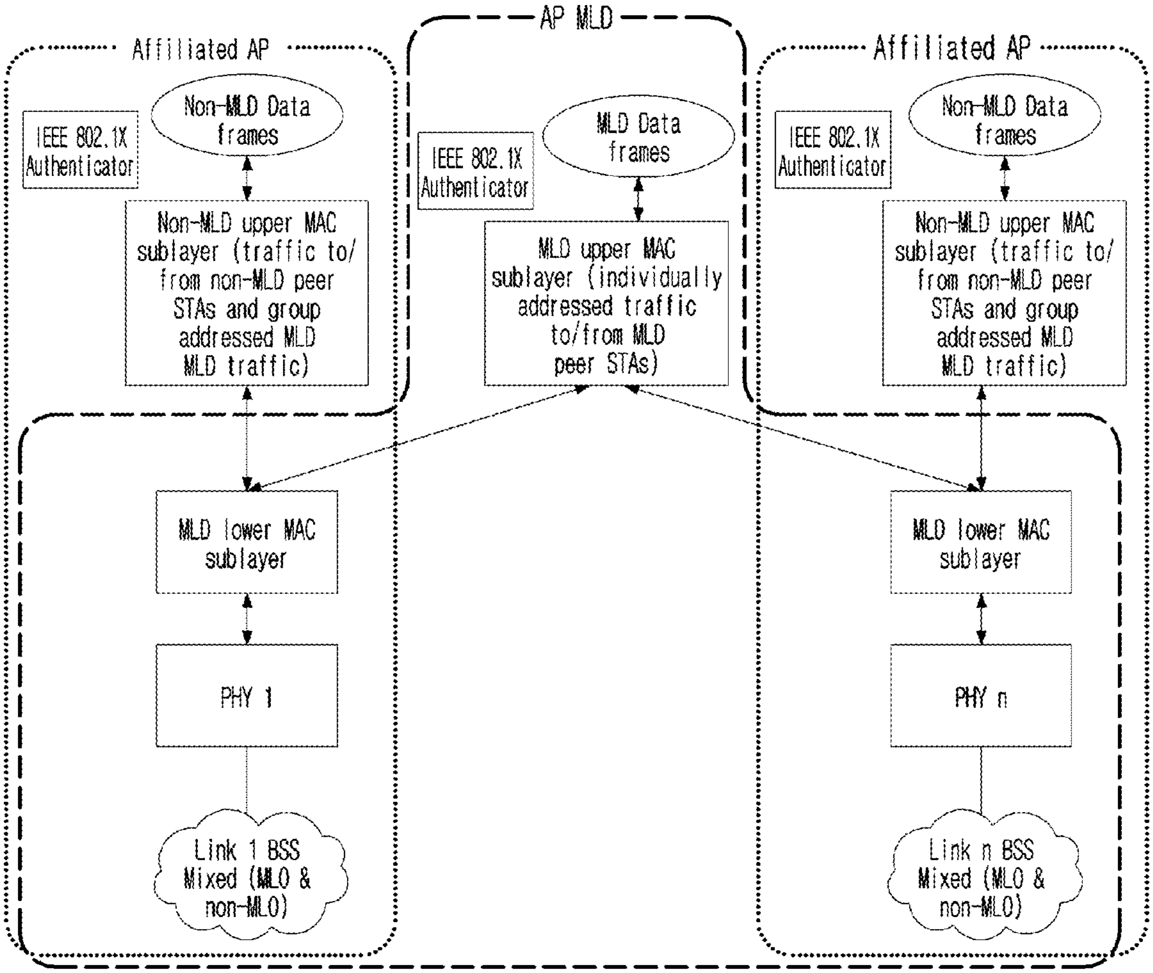
FIG. 9 is a diagram illustrating an example of a high-level structure for an AP MLD to which the present disclosure may be applied.

FIG. 9 is a diagram illustrating an example of a high-level structure for an AP MLD to which the present disclosure may be applied.

An AP MLD may include one or more APs. An AP MLD may have a high-level architecture as illustrated in FIG. 9. For example, the MLD may control various procedures/parameters common to multiple APs using an upper MAC sublayer. For example, authentication, association, sequence number (SN)/packet number (PN) allocation, power-saving buffering for individually addressed frames, etc. may be commonly controlled among APs affiliated with an AP MLD.

Each affiliated AP (e.g., AP 1, . . . , AP n) may provide upper MAC sublayer functionality for non-MLD data frames (e.g., traffic transmitted and received with non-MLD STAs, group-addressed MLD traffic, etc.). The AP MLD may provide upper MAC sublayer functionality for MLD data frames (e.g., traffic transmitted and received with MLD STAs) and provide MLD data to lower MAC sublayers of each affiliated AP. Each affiliated AP can provide PHY functionality (e.g., PHY 1, . . . , PHY n). Both ML operations (MLO) and non-MLO may be performed on links corresponding to each PHY (e.g., link 1, . . . , link n).

MLD-Based Roaming

Before describing the MLD-based roaming according to the present disclosure, a procedure in which a non-AP STA moves or roams from one AP to another in an existing wireless LAN system (e.g., BSS transition) is first described.

Figure 10:
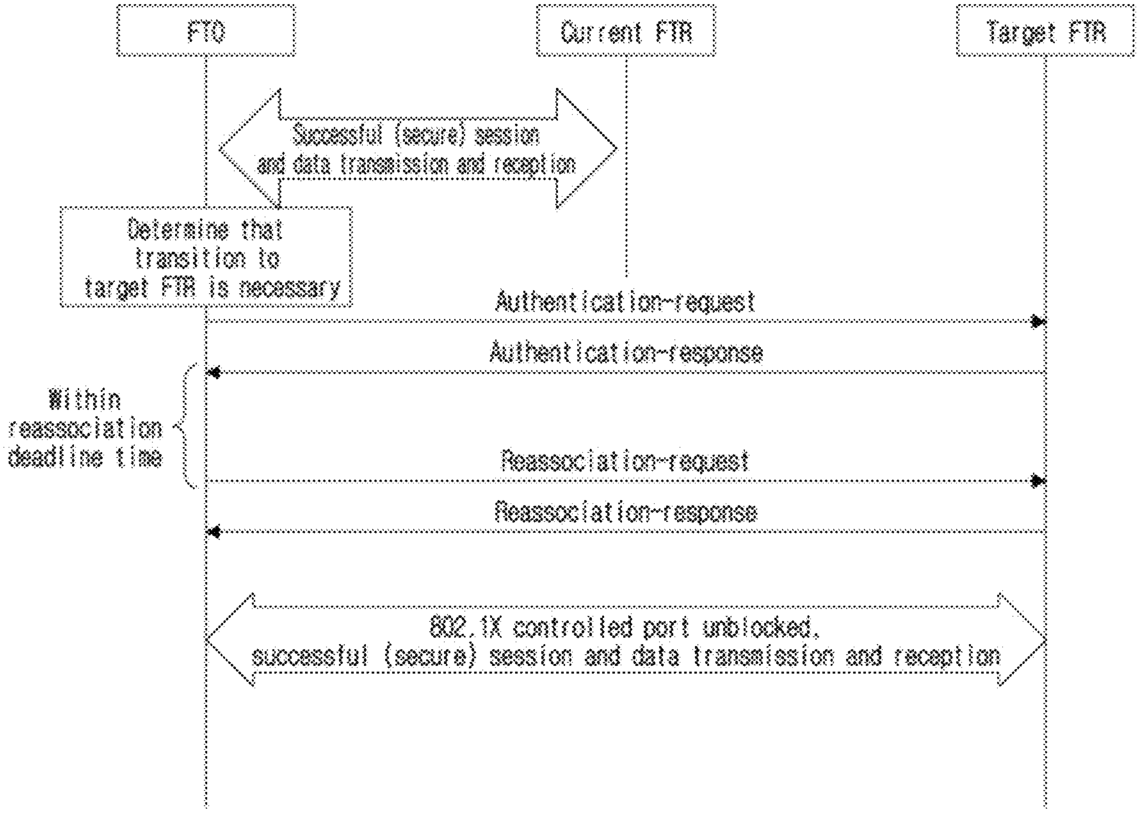
FIG. 10 is a diagram illustrating BSS transition in a conventional wireless LAN system.

FIG. 10 is a diagram for explaining BSS transition in an existing wireless LAN system.

In the case of the FT (fast BSS transition) method, which is a representative example of BSS transition (or roaming), various processes such as authentication request/response and re-association request/response are required between the FTO (FT originator) and the target FTR in order to move from the current FTR (FT responder) to the target FTR. That is, in the existing BSS transition method, a re-association process is required on the same mobility domain.

In addition, after the process illustrated in FIG. 10, various operation parameters such as agreement related to BA (BlockAck) or SCS (Service Classification Service), SN, EDCAF (EDCA function) parameters, etc. are reset. Therefore, FTO must perform a large number of frame exchanges for FT and must perform agreement/configuration with a new FTR again. Therefore, the complexity and overhead of the FT process are high, and data loss may occur during the FT process. As such, it is difficult to provide seamless roaming to STAs in existing wireless LAN systems.

The present disclosure describes examples for seamless roaming based on MLD. For example, based on the AP MLD functionality described with reference to FIG. 9, when a non-AP STA moves/roams between entities affiliated with a single MLD, MLD-level parameters/configurations/agreements can be maintained without being reset.

In the following description, a STA performing roaming is referred to as RSTA, a currently associated AP is referred to as an OAP (old AP) or a first AP (or AP 1) and an AP to be newly associated is referred to a NAP (new AP) or a second AP (or AP 2). In addition, MLD-based roaming that is newly proposed in the present disclosure may be simply referred to as MLD roaming.

Additionally, each of RSTA, OAP, and NAP may be a STA affiliated with different MLDs.

For example, an RSTA is a non-AP STA affiliated with a non-AP MLD, and may perform MLD roaming simultaneously/together with one or more other non-AP STAs.

For example, an OAP may be an AP STA affiliated with the AP MLD 1, and other APs may be affiliated with the AP MLD 1 in addition to the OAP.

For example, a NAP may be an AP STA affiliated with AP MLD 2, and other APs other than a NAP may be affiliated with AP MLD 2.

For example, an OAP and a NAP may be affiliated with the same one upper MLD (or roaming MLD or AP MLD 0). For example, AP MLD 1 with which an OAP is affiliated may be affiliated with an upper MLD (e.g., AP MLD 0), and AP MLD 2 with which a NAP is affiliated may be affiliated with the same upper MLD (e.g., AP MLD 0). Alternatively, among the APs affiliated with AP MLD 1, at least one AP including an OAP may be affiliated with an upper MLD (e.g., AP MLD 0), and other AP(s) may not be affiliated with the same upper MLD (e.g., AP MLD 0) or may be affiliated with another upper MLD or may not be affiliated with an upper MLD. Similarly, among the APs affiliated with AP MLD 2, at least one AP including a NAP may be affiliated with an upper MLD (e.g., AP MLD 0), and other AP(s) may not be affiliated with the same upper MLD (e.g., AP MLD 0) or may be affiliated with another upper MLD or may not be affiliated with an upper MLD.

In addition, considering a non-AP MLD, at least one OAP affiliated with AP MLD 1 may be affiliated with an upper MLD, and at least one NAP affiliated with AP MLD 2 may be affiliated with the same upper MLD. For example, MLD-based roaming from a plurality of OAPs to a plurality of NAPs may be performed.

Hereinafter, the procedure for performing MLD-based roaming of STA is described in detail.

Figure 11:
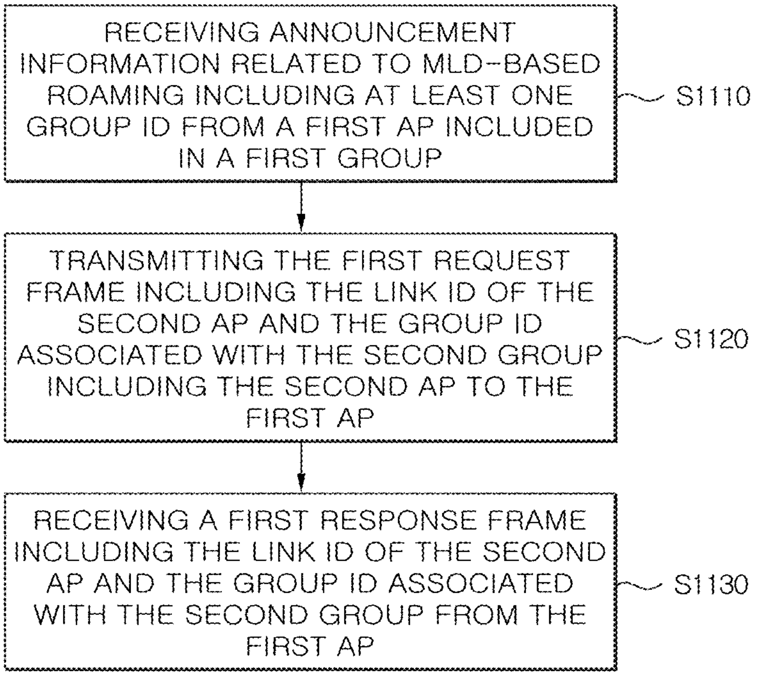
FIG. 11 is a diagram illustrating an example of a method for performing MLD-based roaming by an STA according to the present disclosure.
Figure 12:
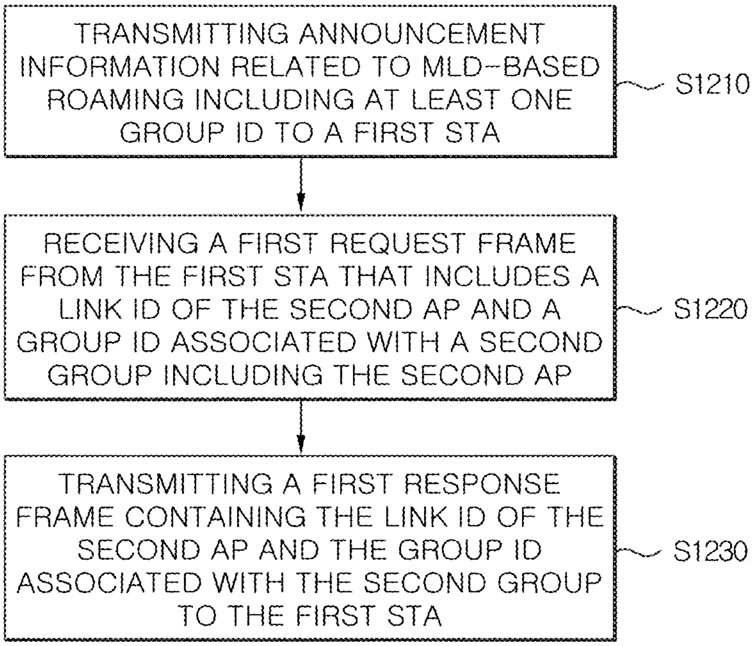
FIG. 12 is a diagram illustrating an example of a method for an AP to support MLD-based roaming by an STA according to the present disclosure.

FIG. 11 is a diagram illustrating an example of a method for performing MLD-based roaming of a first STA according to the present disclosure. In FIGS. 11 and 12, the first STA may be affiliated with a non-AP MLD. Furthermore, the first STA may be associated with a first AP affiliated with a first (AP) group to transmit and receive data.

A first STA may receive announcement information related to multi-link device (MLD)-based roaming including at least one group ID from a first AP included in a first group (S1110).

Here, the announcement information may be included in an MLD-based roaming element or an RNR (reduced neighbor report) element included in a management frame. In addition, the MLD-based roaming element or the RNR element may include one or more parameters for MLD. For example, the one or more parameters for MLD may include at least one group ID, information on whether MLD-based roaming is enabled (i.e., information indicating whether MLD-based roaming can be performed), or at least one of an MLD-based roaming ID. The first STA may exchange a first request frame and a first response frame, which will be described later, with the first AP based on the announcement information.

The first AP may transmit a first request frame (i.e., an MLD roaming request frame) to the first AP, the first request frame including the link ID (identifier) of the second AP and the group ID associated with the second group including the second AP (S1120).

Hereinafter, the first group may mean the first AP group, and the second group may mean the second AP group.

For example, Group 1 and Group 2 may be affiliated with the same AP MLD. To roam from a first AP included in Group 1 to a second AP included in Group 2, a first STA may transmit a first request frame to the first AP.

In another example of the present disclosure, each of the first group and the second group may be mapped to a separate AP MLD. For example, the first group may be mapped to the first AP MLD, and the second group may be mapped to the second AP MLD. That is, in describing the present disclosure, each group may be represented by a separate AP MLD. In addition, the first AP MLD and the second AP MLD may be affiliated with a separate group entity (or the entire AP MLD). The group entity (or the entire AP MLD) may collectively refer to a specific entity to which each AP MLD belongs.

Figure 13:
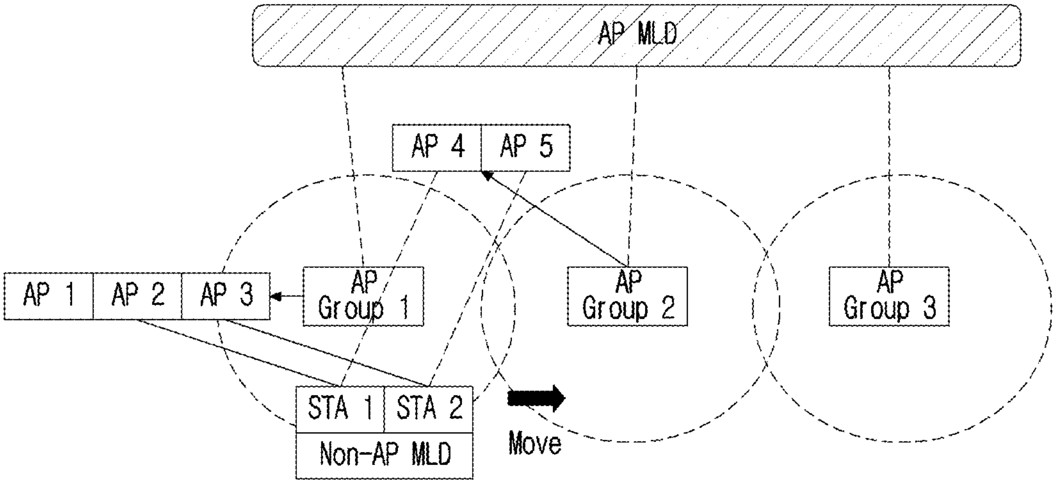
FIG. 13 is a diagram illustrating an example of the structure and procedure of MLD-based roaming according to the present disclosure.
Figure 17:
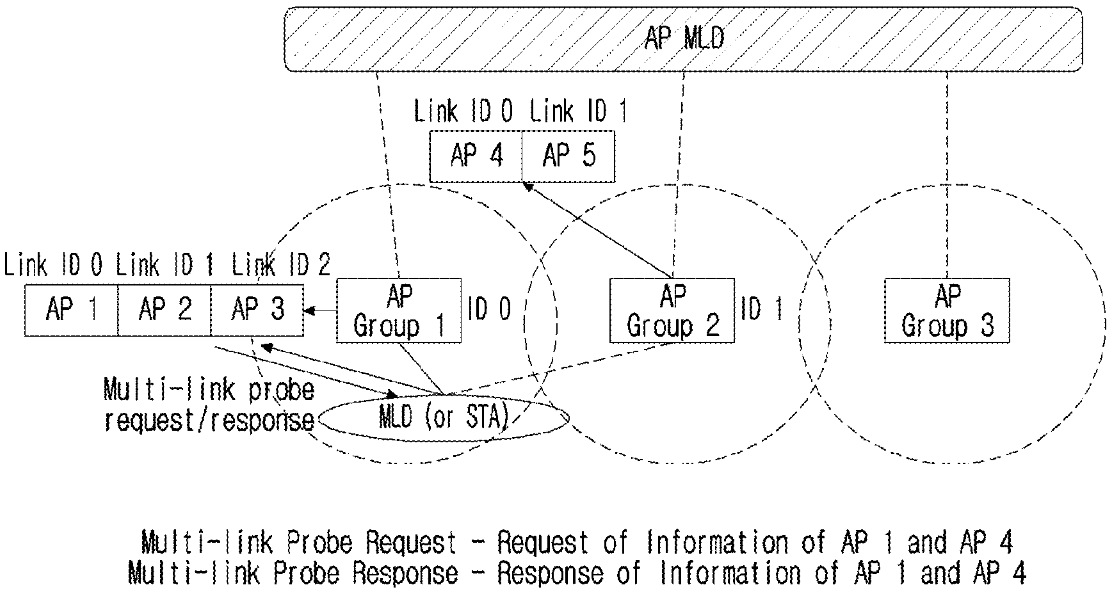
FIG. 17 is a diagram illustrating an example of the structure and procedure of MLD-based roaming according to the present disclosure.

The group entity may correspond to the (entire) AP MLD illustrated in FIGS. 9, 13, and 17. For example, the group object may perform the function of the upper MAC sublayer of the MLD described with reference to FIG. 9.

The first request frame includes a reconfiguration multi-link (ML) element, and a group ID associated with the second group may be included in a common information field or a STA control field of the reconfiguration ML element. The STA-per-profile sub-element of the second reconfiguration ML element includes a STA control field, and the STA control field may include a link ID of the second AP.

Meanwhile, before transmitting the first request frame, the first STA may transmit a second request frame (e.g., a frame including a probe request ML element) to the first STA for requesting information about the second AP. Here, a group ID related to the second group may be included in the common information field or the STA control field of the second request frame, and a link ID of the second AP may be included in the STA control field. That is, the first STA may request information about the second AP by transmitting the second request frame including the group ID related to the second group and the link ID of the second AP to the first AP. Accordingly, the first AP may transmit a second response frame to the second request frame including information about the second AP to the first STA.

For example, the presence bitmap subfield or STA control field of the second request frame may include information indicating whether a group ID is included in the second request frame.

The first STA may receive a first response frame including the link ID of the second AP and the group ID associated with the second group from the first AP (S1130). That is, the first STA may receive a first response frame for the first request frame from the first AP.

The first response frame may include information indicating that the first STA accepts roaming to the second AP, and the first STA may initiate an association process with the second AP based on the information.

Additionally, the first response frame may include traffic identifier (TID)-to-link mapping information for a new link associated with the second AP and an association ID (AID) for the first STA within the second group. The AID and TID-to-Link mapping information for the first STA may be included in the basic ML element of the first response frame.

Meanwhile, based on the triggering of roaming to the second AP, the first STA may transmit a third request frame requesting data transmission and reception with the second AP to the first AP via a distributed system (DS). Here, the roaming trigger to the second AP may mean transmission of the first request frame from the first STA to the first AP or/and transmission of a response frame from the first AP to the first STA. In addition, the third request frame may include a group ID associated with the second group. Through this, the first STA may transmit and receive data with the second AP via the DS before roaming to the second AP is completed.

Meanwhile, after the first STA receives the first response frame from the first AP, a roaming procedure of a second STA affiliated with a non-AP MLD may be initiated. That is, after the roaming procedure with the first STA and the first AP is performed, a roaming procedure of another STA affiliated with the same non-AP MLD may be performed. However, this is only one embodiment, and STAs included in the same non-AP MLD may simultaneously perform a roaming procedure to another AP group.

The method performed by the first STA described in the example of FIG. 11 may be performed by the first device (100) of FIG. 1. For example, one or more processors (102) of the first device (100) of FIG. 1 may receive announcement information related to MLD-based roaming, including at least one group ID, from a first access point (AP) included in a first group through one or more transceivers (106). The one or more processors (102) may transmit a first request frame, including a link ID of a second AP and a group ID associated with a second group including the second AP, to the first AP through one or more transceivers (106). The one or more processors (102) may receive a first response frame, including a link ID of the second AP and a group ID associated with the second group, from the first AP through one or more transceivers (106).

The above memory (104) can store instructions for performing the method described in the example of FIG. 11 when executed by one or more processors (102).

FIG. 12 is a diagram illustrating an example of a method in which a first AP according to the present disclosure supports MLD-based roaming of an STA.

The first AP may transmit announcement information related to MLD-based roaming, including at least one group ID, to the first STA (S1210). That is, the first AP may transmit announcement information including parameters related to MLD-based roaming to the first STA.

The first AP may receive a first request frame from the first STA that includes a link ID of the second AP and a group ID associated with a second group including the second AP (S1220).

That is, the first AP may receive a first request frame from the first STA for roaming to a second AP affiliated with the second group. Before or after step S1220, the first AP may receive a second request frame requesting information about the second AP from the first STA. At this time, the first AP may transmit information about the second AP to the first STA.

The first AP may transmit a first response frame containing the link ID of the second AP and the group ID associated with the second group to the first STA (S1230). The first response frame may initiate an association procedure between the first STA and the second AP.

The method performed by the first AP described in the example of FIG. 12 may be performed by the second device (200) of FIG. 1. For example, one or more processors (202) of the second device (200) of FIG. 10 may transmit announcement information related to MLD-based roaming, including at least one group ID, to the first STA via one or more transceivers (206). The one or more processors (202) may receive, from the first STA via one or more transceivers (206), a first request frame, including a link ID of the second AP and a group ID associated with a second group including the second AP. The one or more processors (202) may transmit, to the first STA via one or more transceivers (206), a first response frame, including a link ID of the second AP and a group ID associated with the second group.

Furthermore, one or more memories (204) of the second device (200) may store instructions for performing the method described in the example of FIG. 10 when executed by one or more processors (202).

The examples of FIGS. 11 and 12 may correspond to some of the various examples of the present disclosure. Below, various examples of the present disclosure, including the examples of FIGS. 11 and 12, will be described in more detail.

Embodiment 1

Embodiment 1 describes exemplary operations of STAs and APs for MLD-based roaming. As an example of the present disclosure, FIG. 13 is a diagram illustrating an example of the structure and procedure of MLD-based roaming according to the present disclosure.

As illustrated in FIG. 13, AP 1, AP 2, and AP 3 may be affiliated with AP group 1, and AP 4 and AP 5 may be affiliated with AP group 2. Each AP group may not be collocated, and the AP(s) affiliated with each AP group may be collocated at the same or similar locations. That each AP is collocated may include not only the case where each AP is affiliated with the exact same device, but also the case where each AP is collocated at a logically similar location even if it does not belong to the exact same device.

Since AP MLD is a logical entity, it can be implemented as a specific physical device, but it refers to an MLD that covers affiliated APs regardless of location and performs/applies MLO. In other words, all APs affiliated with an AP group may include affiliated APs of one AP MLD.

As an example of the present disclosure, as illustrated in FIG. 13, it is assumed that a non-AP MLD is in a multi-link setup with an AP MLD, and STA 1 and STA 2 are each connected to AP 2 and AP 3 included in AP group 1. When the non-AP MLD moves to an area where AP group 2 exists, roaming from AP group 1 to AP group 2 may be required. That is, through the roaming, STA 1 may be connected to AP 4, and STA 2 may be connected to AP 5. Here, during the roaming process, STA 1 and STA 2 may temporarily associate with AP 4 and AP 5, respectively, so that AP 4 and AP 5 may transmit frames to STA 1 and STA 2, respectively.

Here, the non-AP MLD may include multiple affiliated STAs, or may include one STA. The roaming operation/architecture illustrated in FIG. 13 may be applied to a non-AP MLD including one or more affiliated STAs, and the roaming operation/architecture may also be applied to non-AP STA(s) that do not form the MLD.

In describing the present disclosure, roaming may be applied not only to movement between groups but also to movement between APs within a specific AP group. In addition, MLD-based roaming according to the present disclosure may be performed by changing links while maintaining the ML setup without tearing down the existing ML setup. For example, while maintaining the ML setup for the upper MLDs of AP 1 and AP 2, an STA MLD may move from AP group 1 to AP group 2 by changing links within the upper MLD. Accordingly, overhead and the risk of data loss can be lowered compared to the existing BSS transition.

The MLD-based roaming procedure may include configuring an AP group ID (Embodiment 1-1), announcing an AP (Embodiment 1-2), exchanging information about APs within each AP group (request in Embodiment 1-3 and response in Embodiment 1-4), and exchanging frames between the AP and the STA (request in Embodiment 1-5 and response in Embodiment 1-6).

An ID may be assigned/set for each AP group (consisting of AP(s) deployed at the same location). In the present disclosure, the ID assigned/set for each AP group will be referred to as a group ID. For example, the group ID may be set as a unique ID within a single AP group. As another example, the group ID may be set as a unique ID for each AP group within the entire AP MLD.

The announcement may correspond to a procedure in which each AP affiliated with the upper MLD informs the STA(s) of information such as whether MLD-based roaming is supported. Frame exchange between the STA and the AP may be performed based on this announcement information.

Frame exchange may correspond to a procedure of transmitting and receiving a frame that triggers/initiates MLD-based roaming between an AP and a STA. Through frame exchange, information and configurations required for MLD-based roaming may be negotiated between the AP and the STA, and MLD-based roaming may be completed based on the negotiated information/settings. Accordingly, the STA may no longer operate with an OAP (old AP) (e.g., an AP included in AP group 1) and may operate with an NAP (New AP) (e.g., an AP included in AP group 2).

In this way, for MLD-based roaming to be triggered/initiated, frame exchange is required between the STA and the AP. The exchanged frames may correspond to management frames (e.g., beacons, (re)association requests/responses, probe requests/responses, action frames, etc.). For example, an action frame, which is a type of management frame, may be used for frame exchange.

In the examples described below, the frame transmitted by an STA (or AP) to request MLD roaming to an AP (or STA) is referred to as an MLD roaming request frame, and the frame transmitted by an AP (or STA) to the STA (or AP) in response to the MLD roaming request frame is referred to as an MLD roaming response frame.

Hereinafter, specific examples of the procedure for setting a group ID for each AP group, the procedure for requesting information about APs within each AP group, the notification procedure for MLD-based roaming, and the frame exchange procedure are described.

Embodiment 1-1

Embodiment 1-1 relates to a procedure for setting a group ID for each AP group. A moving MLD (or STA) may need to recognize at least one AP among the AP MLDs to which it is connected, to perform roaming. In addition, when the MLD (or STA) requests roaming, the AP MLD may check data and management information to be transmitted from the OAP to the NAP, depending on which NAP the MLD (or STA) is moving to. Therefore, Embodiment 1-1 describes an identification method that takes into account affiliated AP(s) that are not arranged in the same location within the AP MLD (i.e., a method for setting an ID for roaming in the AP MLD).

An ID (i.e., a group ID) may be assigned to a group of APs collocated in the same location. For example, a unique group ID may be set within an AP group (Embodiment 1-1-1). As another example, a unique ID may be set for each AP group within the entire AP MLD (Embodiment 1-1-2).

Embodiment 1-1-1

Embodiment 1-1-1 relates to a method for setting a unique ID within an AP group in an AP MLD. That is, the group ID may be unique within one AP group.

As an example of the present disclosure, the group ID may be set to an integer greater than or equal to 0. For example, if the field indicating the group ID consists of 4 bits, the group ID may be set to one of 0 to 15. As another example, if the field indicating the group ID consists of 8 bits, the group ID may be set to one of 0 to 127.

For example, if the group ID is 0, APs with the group ID may be affiliated with the same AP group deployed at the same location. That is, the MLD (or STA) may determine that APs with the group ID are deployed at the same location. Other group IDs may be mapped so that they can be uniquely identified to each group.

Additionally, since other APs in the set of multiple BSSIDs (e.g., transmitted BSSID (i.e., TxBSSID) or non-transmitted BSSID (nonTxBSSID)) to which each AP in the AP group belongs also use the same physical resources, the same group ID may be assigned to the other APs. However, the AP MLD IDs of the AP MLDs to which the other APs belong may be different.

Embodiment 1-1-2

Embodiment 1-1-2 relates to a method for setting a unique ID within an AP MLD. That is, a group ID may be set uniquely for each AP group within the entire AP MLD.

As described above, the group ID may be set to an integer greater than or equal to 0. For example, if the field indicating the group ID consists of 4 bits, the group ID may be set to one of 0 to 15. As another example, if the field indicating the group ID consists of 8 bits, the group ID may be set to one of 0 to 127.

Additionally, a group ID of APs performing roaming may be set. That is, an MLD roaming ID for MLD roaming may be set between APs having the corresponding group ID.

The existing MDID (mobility domain ID) field may be used to set the MLD roaming ID and/or group ID, but since the MDID field has a size of 2 octets, the MLD roaming ID and/or group ID may be set in a smaller field.

Embodiment 1-2

Embodiment 1-2 relates to an announcement procedure for MLD-based roaming based on group ID.

Each AP included in the AP MLD may announce whether MLD-based roaming described in the present disclosure is possible and a group ID, etc. For example, each AP may transmit announcement information including information indicating whether roaming is possible (e.g., "MLD roaming enabled"), a group ID, and/or an MLD roaming ID. The information indicating whether roaming is possible may be composed of 1 bit, but is not limited thereto. In addition, the group ID refers to the group ID of the AP group constituting the AP MLD as described above. That is, APs having the same group ID may be affiliated with the same AP group.

The announcement information may be transmitted via a management frame (e.g., a beacon frame, a probe frame, a (re)association response frame, etc.). For example, it may be included in an MLD roaming information element (IE) or a reduced neighbor report (RNR) IE containing the announcement information.

For example, the RNR IE may include a target beacon transmission time (TBTT) information header, an operation class, a channel number, and a TBTT information set field. Among these, the TBTT information set may include one or more TBTT information fields. As illustrated in (a) of FIG. 14, the TBTT information field may include neighboring AP TBTT offset, BSSID, short BSSID, BSS parameter, 20 MHz PSD (Power Spectral Density), and MLD parameter subfields. The MLD parameter may include, in addition to the AP MLD ID, link ID, BSS parameter change count, all update included, and disabled link indication fields, an MLD roaming enabled subfield corresponding to announcement information.

Additionally, the TBTT information field may include MLD roaming parameters, and the MLD roaming parameters may include announcement information (i.e., MLD roaming enabled information and group ID information, etc.). The example of (a) in FIG. 14 corresponds to a case where the size of the MLD parameter subfield is not sufficient to include the announcement information. Although the size of the MLD parameter subfield may be changed, this may cause decoding issues for IEEE 802.11 be-based STAs.

Here, since the fact that the MLD roaming parameter is included in the TBTT information field itself may mean that MLD roaming is possible, the MLD roaming enabled information may be omitted.

Figure 14:
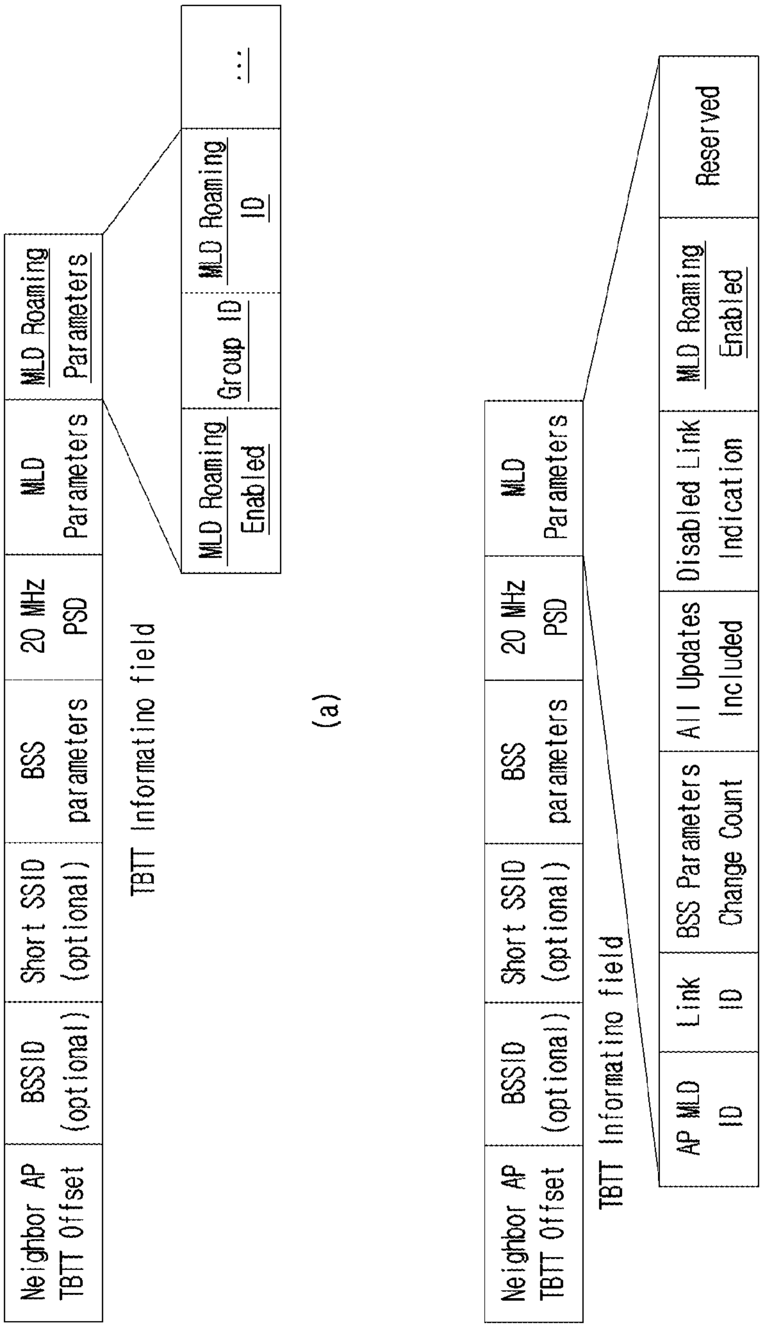
FIG. 14 is a diagram illustrating an example of an element including announcement information according to the present disclosure.

As another example, as illustrated in (b) of FIG. 14, MLD roaming enabled information may be included in the MLD parameter subfield. In addition, the MLD roaming ID and/or group ID may be transmitted via the MLD roaming parameter subfield or a separate field.

Additionally or alternatively, the above-described notice information may be included in the basic multi-link IE.

Embodiment 1-3

Before roaming, a non-AP MLD (e.g., STA) may request information about APs within each AP group for roaming within the AP MLD. The non-AP MLD can request information about APs within each group through a multi-link probe request/response frame, which is used to obtain information related to multi-link operation (MLO).

Embodiments 1-3 relate to a multi-link probe request frame transmitted by a non-AP MLD to an AP. The multi-link probe request frame may include a probe request ML (multi-link) IE, and a group ID may be included in various fields according to the embodiments described below.

Embodiment 1-3-1

As an example of the present disclosure, as illustrated in (a) of FIG. 15, the presence bitmap subfield of the probe request ML element may include a subfield (e.g., a group ID present subfield) indicating whether a group ID is present in the element. And, as illustrated in (b) of FIG. 15, the group ID may be included in the common information field of the element. The presence bitmap subfield may be positioned before the common information field on the probe request ML element.

If the group ID is included only in the common information field, the multi-link probe request frame including the common information field may only request information from AP(s) in the same AP group. That is, the multi-link probe request frame cannot request information from APs with different group IDs within the same AP MLD.

Embodiment 1-3-2

As illustrated in (c) and (d) of FIG. 15, the link information field of the probe request ML element may include one or more Per-STA Profile subelements, and the STA control field of each of the one or more Per-STA Profile subelements may include a link ID and a group ID (i.e., an ID of an AP group). That is, a request for information about one AP may be indicated through the group ID and link ID included in the STA control field of the Per-STA Profile subelement.

Information about one or more APs corresponding to one or more group IDs may be requested through one or more STA-specific profile sub-elements. However, when requesting information about AP(s) having the same group ID, overhead may be greater than the method according to embodiment 1-3-1.

Embodiment 1-3-3

As illustrated in (a) and (b) of FIG. 16, the link information field of the probe request ML element may include one or more Per-STA profile sub-elements, and the STA control field of each of the one or more Per-STA profile sub-elements may include information indicating whether a group ID exists in each of the one or more Per-STA profile sub-elements (i.e., group ID presence information).

That is, through the group ID existence information of the STA control field included in the Per-STA profile sub-element, it may be indicated whether the ID of the AP group (i.e., group ID) to which the AP corresponding to the link ID included in the STA control field belongs exists in the Per-STA profile sub-element. Here, the group ID may be included in the STA information field or the STA profile field of the Per-STA profile sub-element.

Accordingly, information about one or more APs corresponding to one or more group IDs may be requested via one or more Per-STA profile sub-elements.

Additionally or alternatively, the method of embodiment 1-3-1 (i.e., the method in which the group ID is included in the common information field) and the method of embodiment 1-3-3 (i.e., information indicating whether the group ID exists in the STA control field) may be combined. When requesting only information of APs corresponding to the same group ID, the group ID does not need to be included in the Per-STA profile sub-element, thereby reducing overhead.

As another example of the present disclosure, it is assumed that a group ID is indicated through the common information field. The inclusion of the common information field in the Per-STA profile sub-element may implicitly indicate that information from APs corresponding to the same group ID is requested. Accordingly, the group ID may not be present in the STA control field, and the group ID presence subfield may not be included in the presence bitmap subfield.

Embodiment 1-4

A multi-link probe request frame may include a basic ML element, and a group ID may be included in a specific subfield of the basic ML element according to embodiments described below.

Embodiment 1-4-1

As an example of the present disclosure, when a multi-link probe request frame including a group ID (i.e., when the group ID is included in the common information field) is transmitted according to embodiment 1-3-1, the group ID may be included in the common information field included in the basic ML element of the multi-link probe response frame.

As described in Embodiment 1-3-1, the presence bitmap subfield of the corresponding basic ML element may indicate whether a group ID exists in the corresponding common information field. Accordingly, the multi-link probe response frame may include information about AP(s) affiliated with the same AP group having the group ID indicated through the corresponding common information field.

Embodiment 1-4-2

As an example of the present disclosure, when a multi-link probe request frame including a group ID (i.e., when the group ID is included in the link information field) is transmitted according to embodiment 1-3-2, the group ID may be included in the link information field of the basic ML element of the multi-link probe response frame.

Specifically, the link information field of the basic ML element may include one or more Per-STA Profile subelements, and the STA control field of each of the one or more Per-STA Profile subelements may include a link ID and a group ID (i.e., an ID of an AP group).

Information about one or more APs corresponding to one or more group IDs may be provided through one or more Per-STA profile sub-elements. However, when providing information about AP(s) having the same group ID, overhead may be greater than the method according to embodiment 1-4-1.

Embodiment 1-4-3

Each STA control field of each Per-STA profile sub-element may include information indicating whether a group ID exists in each of one or more Per-STA profile sub-elements (i.e., group ID presence information).

That is, through the group ID existence information of the STA control field included in the Per-STA profile sub-element, it may be indicated whether the ID of the AP group (i.e., group ID) to which the AP corresponding to the link ID included in the STA control field belongs exists in the Per-STA profile sub-element. Here, the group ID may be included in the STA information field or the STA profile field of the Per-STA profile sub-element.

Information about one or more APs corresponding to one or more group IDs may be provided via one or more Per-STA profile sub-elements.

Additionally or alternatively, the method of embodiment 1-4-1 (i.e., the method in which the group ID is included in the common information field) and the method of embodiment 1-4-3 (i.e., information indicating whether the group ID exists in the STA control field) may be combined. If only information about APs corresponding to the same group ID is provided, the group ID does not need to be included in the Per-STA profile sub-element, thereby reducing overhead.

As an example of the present disclosure, when a unique ID is set within an AP group in the AP MLD as described in Embodiment 1-1-1, if the group ID is 0, the group ID may be omitted. That is, when the group ID does not exist, the AP that has received the multi-link probe request frame can implicitly determine that the request frame is a request for information about other APs regarding the group to which it belongs.

As another example of the present disclosure, if a group ID is included in the common information field, the STA may implicitly determine that the information included in the multi-link probe response frame is information about the AP(s) corresponding to the same group ID. Accordingly, the group ID presence field may not be included in the multi-link probe response frame.

Multi-link Probe Request/Response Frame Exchange Procedure

As an example of the present disclosure, FIG. 17 illustrates a multi-link probe request/response frame exchange procedure.

The MLD (or STA) may request information about AP 1 and AP 4 by sending a multi-link probe request frame to AP 3, which belongs to AP Group 1. Here, AP 1 may be affiliated with AP Group 1 (the AP group with Group ID 0) and AP 4 may be affiliated with Group 2 (the AP group with Group ID 1). Therefore, the MLD (or STA) is requesting information about APs affiliated with different groups. Therefore, the common information field of the multi-link probe request frame may not include a group ID.

And, the multi-link probe request frame may include a per-STA profile sub-element corresponding to AP 1 and a per-STA profile sub-element corresponding to AP 2. The per-STA profile sub-element corresponding to AP 1 may include group ID 0, and the per-STA profile sub-element corresponding to AP 4 may include group ID 1. As illustrated in FIG. 17, the link IDs of each of AP 1 and AP 4 may be both 0 or distinguished by the group ID.

AP 3 may provide information about AP 1 and AP 4 to MLD (or STA) through a multi-link probe response frame. Since information about APs affiliated with different AP groups is provided, a group ID may not be present in the common information field of the multi-link probe response frame. In addition, the STA-specific profile sub-elements corresponding to each of AP 1 and AP 4 included in the response frame may include group ID 0 and ID 1, respectively.

Embodiment 1-5

Request information for triggering/initiating MLD-based roaming may be included in a management frame (e.g., an MLD roaming request frame). For example, the MLD roaming request frame may have the exemplary format of Table 1. The format of Table 1 is exemplary, and some fields may be omitted or may include additional fields not illustrated.

TABLE 1

| Order | Information |
|---|---|
| 1 | Category |
| 2 | UHR action or protected UHR action |
| 3 | Dialog Token |
| 4 | Reconfiguration ML element |

The category of order 1 may be set to a value indicating a category corresponding to the MLD roaming request frame. For example, the category may correspond to a new UHR action or a protected UHR action. This is exemplary, and the MLD roaming request frame may also be defined as a category with a different name. The UHR action or protected UHR action of order 2 may be set to a value corresponding to the MLD roaming request.

The dialog token of order 3 may be set to a value for matching requests and responses.

The reconfiguration ML element of order 4 corresponds to an element including information required for an MLD-based roaming request. This is exemplary, and elements/fields with other names including information required for an MLD roaming request may be defined and utilized.

Figure 18:
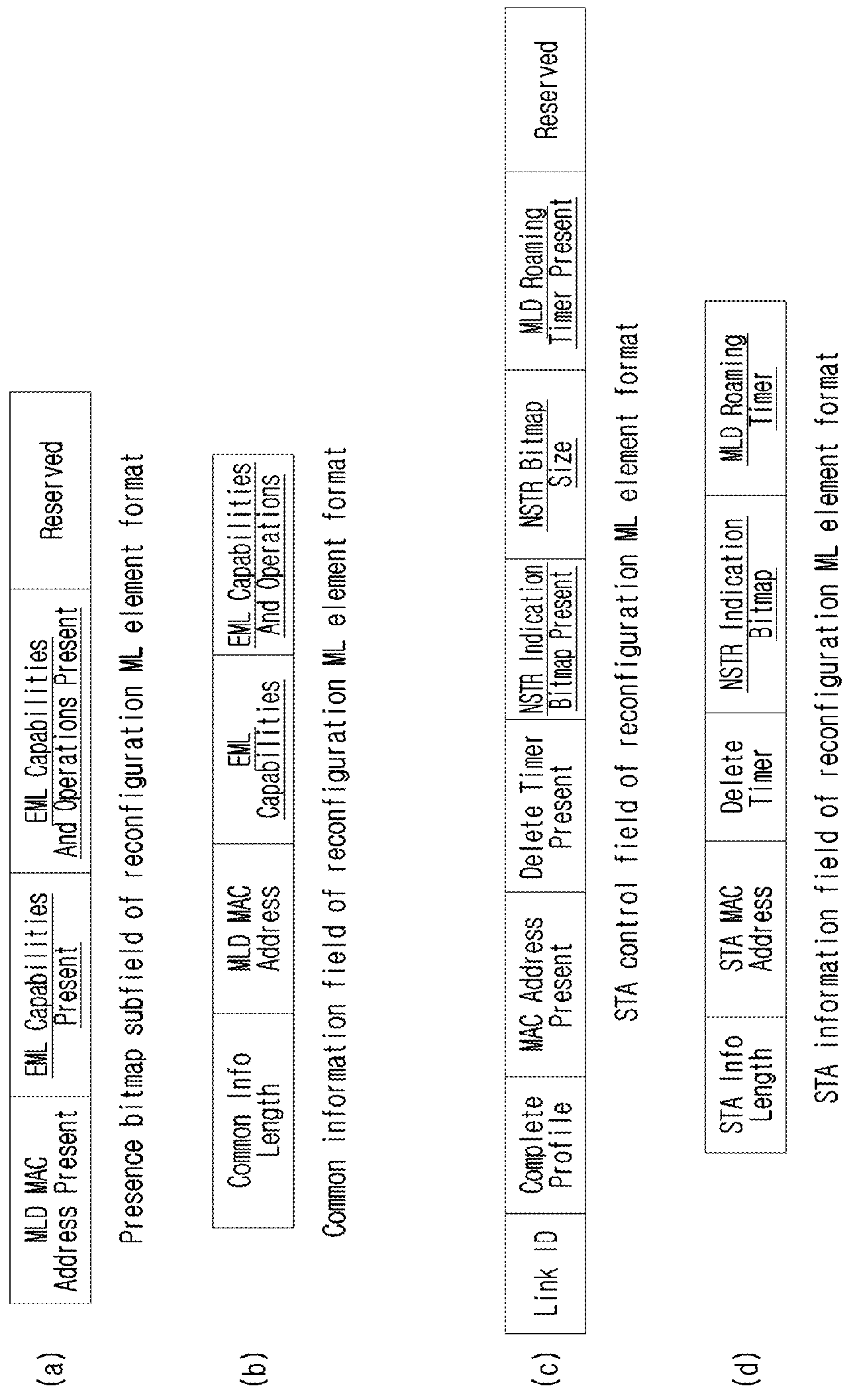
FIG. 18 is a diagram illustrating an example of a reconfiguration ML element according to the present disclosure.

FIG. 18 is a diagram illustrating an example of a reconfiguration ML element including request information according to the present disclosure.

FIG. 18(*a*) illustrates an example of a presence bitmap field (e.g., Presence Bitmap in the Multi-Link Control field of FIG. 8). The presence bitmap of a reconfiguration ML element may include information on whether an MLD MAC address subfield exists. In addition, the presence bitmap according to the present disclosure may indicate, through specific bit positions in the bitmap, whether an enhanced ML (EML) capability subfield exists in a common information field and whether an MLD capability and operation subfield exists in a common information field.

FIG. 18(*b*) illustrates an example of a common information field (e.g., the Common Info field of FIG. 8). The common information field of the reconfiguration ML element may include a common information length subfield and an MLD MAC address subfield. Additionally, the common information field according to the present disclosure may include both, one of, or neither of the EML capability subfields or the MLD capability and operation subfields (depending on the value at the corresponding bit position of the presence bitmap).

When more than one STA moving to NAP (especially in case of non-AP MLD) performs MLD-based roaming at the same time, EML capability information/MLD capability and operation information may be different, so this information may be provided to the AP as MLD roaming request information.

FIG. 18(*c*) shows an example of a STA control (e.g., STA Control of FIG. 8) field included in a STA-per-profile sub-element of a link information field (e.g., Link Info field of FIG. 8) of a reconfiguration ML element. FIG. 18(*d*) shows an example of a STA information (e.g., STA Info of FIG. 8) field included in a Per-STA profile sub-element of a link information field (e.g., Link Info field of FIG. 8) of a reconfiguration ML element.

When more than one STA performs MLD-based roaming simultaneously, one or more per-STA profile sub-elements may be included in the MLD roaming request frame.

The presence or absence of each subfield included in the STA information field may be indicated by the presence subfield of the corresponding subfield in the STA control field. For example, the NSTR indication bitmap presence subfield of the STA control field may indicate whether the NSTR indication bitmap subfield exists in the STA information field, and if present, the bitmap size may be indicated by the NSTR bitmap size subfield of the STA control field. For example, the MLD roaming timer presence subfield of the STA control field may indicate whether the MLD roaming timer subfield exists in the STA information field.

The value of the Link ID subfield of the STA control field of FIG. 18(*c*) may be set to a link identifier value corresponding to one of the NAPs (e.g., AP 2 affiliated with AP MLD 2, and, if present, other AP(s) affiliated with AP MLD 2). For example, the Link ID subfield of the STA control field of the first Per-STA profile subelement may be set to a link identifier value corresponding to AP 2 affiliated with AP MLD 2, and the Link ID subfield of the STA control field of the second Per-STA profile subelement may be set to a link identifier value corresponding to another NAP affiliated with AP MLD 2.

The complete profile of the STA control field of FIG. 18(*c*) may correspond to complete information of the STA (i.e., all information included in the (re)association request frame). In the MLD-based roaming process, since a new STA is not associated with an AP affiliated with an upper MLD, but an existing STA moves between APs affiliated with the upper MLD, a case in which the capabilities and operation parameters of the STA do not change may be considered. Considering a case in which the information of the STA is known to the upper MLD, the complete profile subfield of FIG. 18(*c*) may be set to a value indicating that changed profile information (or partial profile information) is included.

For example, a partial profile corresponds to a case where the value of the complete profile subfield of the STA control field is 0, and only information fields/elements that change in the STA profile field (e.g., the STA Profile field of FIG. 8) within the Per-STA profile sub-element may be included (i.e., information that changes compared to OAP when moving to NAP). Alternatively, the complete profile subfield of the STA control field may be changed to a name called a changed profile subfield, and only information fields/elements that change in the STA profile field (i.e., information that changes compared to OAP when moving to NAP) may be included when the value of the subfield is 1.

Alternatively, it may be considered that the capabilities and operating parameters of the STA are completely changed during the MLD-based roaming process. In this case, the value of the complete profile subfield of FIG. 18(*c*) may be set to 1, and the STA profile field may include complete information (e.g., all information included in the (re)association request frame).

When an STA moves to a different AP, information about STR or NSTR for each link may be different from a non-AP MLD perspective, so an NSTR indication bitmap (e.g., the NSTR indication bitmap subfield of FIG. 18(*d*)) may be included in the MLD roaming request frame.

The MLD roaming timer subfield may indicate the point in time when MLD-based roaming is completed and the STA no longer operates with the OAP and operates with the NAP. The MLD roaming timer value included in the request frame transmitted by the STA may be interpreted/used as reference information in the AP or upper MLD.

Additionally or alternatively, the MLD roaming timer information may include a value for each of one or more NAPs, or may include a value that is common to one or more NAPs. For example, a number of individual MLD roaming timer information corresponding to the number of NAPs may be included in the per-STA profile sub-element of the MLD roaming request frame. For example, a single MLD roaming timer information that is common to one or more NAPs may be included in the common information field of the MLD roaming request frame.

A group ID can be added to the reconfiguration ML element illustrated in FIG. 18. The group ID refers to the ID of the AP group to which the non-AP MLD (or STA) roams.

Embodiment 1-5-1

As an example of the present disclosure, a group ID may be included in the common information field of a reconfiguration ML element. Specifically, as illustrated in (a) of FIG. 19, whether a group ID is included in the common information field of a reconfiguration ML element may be indicated through the presence bitmap of the reconfiguration ML element. As illustrated in (b) of FIG. 19, when a group ID is included only in the common information field, roaming to an AP(s) in an AP group with the same group ID may be requested through an MLD roaming request frame.

That is, if a group ID is included in the common information field, a non-AP MLD (or STA) cannot request roaming for multiple group IDs even within the same AP MLD. For example, if a group ID of a specific AP group is included in the common information field, a non-AP MLD (or STA) cannot request roaming to an AP of the AP group to which it currently belongs or an AP affiliated with an AP group other than the specific AP group. However, when performing roaming between groups, the method according to embodiment 1-5-1 may have reduced overhead compared to the case where a group ID is included in the link information field.

Embodiment 1-5-2

As an example of the present disclosure, as illustrated in (c) of FIG. 19, the reconfiguration ML element may include a link information field, and the link information field may include one or more per-STA profile sub-elements. And, as illustrated in (d) of FIG. 19, a roaming request to a specific AP affiliated with a specific AP group may be indicated through a Link ID and a Group ID included in the STA control field of the per-STA profile sub-element.

Roaming may be requested for one or more APs corresponding to one or more group IDs via one or more Per-STA profile sub-elements. However, if roaming is requested based on the same group ID, the overhead may be greater than the method according to embodiment 1-5-1.

Embodiment 1-5-3

As an example of the present disclosure, as illustrated in (a) of FIG. 20, the STA control field of the Per-STA profile sub-element includes a group ID presence sub-field, and the group ID presence sub-field may indicate whether an AP group ID to which an AP corresponding to a specific link ID belongs exists. In addition, as illustrated in (b) of FIG. 20, the group ID may be included in the STA information field or the STA profile field.

Roaming may be requested for one or more APs corresponding to one or more group IDs through the Per-STA profile sub-elements. In particular, assume a case in combination with the method according to embodiment 1-5-1 (i.e., the method of including the group ID in the common information field). In this case, if roaming is requested for APs corresponding to the same group ID, the group ID may not be included in the STA information field or the STA profile field, thereby reducing overhead.

As another example, if a group ID is indicated through the common information field, roaming to the AP(s) corresponding to the same group ID may be implicitly indicated to be requested. Accordingly, the group ID may not be included in the STA information field or the STA profile field, and the Group ID presence field may also not be present.

Embodiment 1-6

Response information for an MLD-based roaming request may be included in a management frame (e.g., an MLD roaming response frame). For example, the MLD roaming response frame may have the exemplary format of Table 2. The format in Table 2 is exemplary, and some fields may be omitted or may include additional fields not illustrated.

TABLE 2

| Order | Information |
|---|---|
| 1 | Category |
| 2 | UHR action or protected UHR action |
| 3 | Dialog Token |
| 4 | Status code |
| 5 | Basic ML element |
| 6 | Group key information |
| 7 | AID |
| 8 | Channel switching announcement element (optional) |
| 9 | Extended Channel Switching announcement Element (optional) |
| 10 | TID-to-link mapping element (optional) |

The MLD roaming response frame may include link-level parameters. For example, the link-level parameters may include information necessary to change the link while maintaining the ML setup. The category of order 1 may be set to a value indicating the category corresponding to the MLD roaming response frame. For example, the category may correspond to a new UHR action or a protected UHR action. This is exemplary, and the MLD roaming response frame may also be defined as a category with a different name.

The UHR action or protected UHR action of order 2 may be set to a value corresponding to the MLD roaming response.

The dialog token of order 3 may be set to a value for matching requests and responses.

The status code of order 4 may be set to one of various values indicating success, failure, accept, reject, unsupported, invalid, error, etc. Among the values indicated by the status code, failure, rejection, unsupported, invalid, error, etc. may be defined as different values depending on the cause.

The basic ML element of order 5 may include information required for roaming related to the upper MLD (or roaming MLD) and the roaming target AP/AP MLD (e.g., NAP or AP MLD including NAP). For this purpose, some fields of the existing basic ML element format may be modified, omitted, or new fields may be added.

For example, the common information field of the basic ML element may have a format similar to the example of the common information field of FIG. 8. Here, the common information field of the basic ML element of the MLD roaming response frame may include information common to or corresponding to the NAP(s) through which one or more STAs perform MLD-based roaming.

For example, the link information field of the basic ML element may basically have a format similar to the example of the link information field of FIG. 8. Here, the link information field of the basic ML element of the MLD roaming response frame may include one or more per-STA profile sub-elements for corresponding APs when one or more STAs perform MLD-based roaming simultaneously. Accordingly, the STA control field, the STA information field, and/or the STA profile field included in the per-STA profile sub-element of the link information field of the basic ML element of the MLD roaming response frame may include the following characteristics.

The link ID subfield of the STA control field may be set to a link ID value corresponding to the NAP.

A complete profile in the STA control field may correspond to complete information of the AP (i.e., all information included in the (re)association response frame). When an STA performs MLD-based roaming between APs affiliated with the same upper MLD (or roaming MLD), a case may be considered where the capabilities or operating parameters of the AP do not change. In this case, the complete profile subfield may be set to a value (e.g., 0) indicating that changed profile information (or partial profile information) is included. Accordingly, the STA profile field in the per-STA profile subelement may only include information fields/elements that change (i.e., information that changes in a NAP compared to an OAP).

Alternatively, it may be considered that the capabilities and operating parameters of the AP may be completely changed during the MLD-based roaming process. In this case, the value of the complete profile subfield may be set to 1, and the STA profile field may contain complete information (e.g., all information included in the (re)association response frame).

The STA control field may include a field indicating whether an MLD roaming timer exists. If the MLD roaming timer is indicated to exist, the STA information field may include an MLD roaming timer subfield. The MLD roaming timer subfield may indicate a point in time when MLD-based roaming is completed and the STA no longer operates with an OAP but operates with a NAP. The value of the MLD roaming timer included in the MLD roaming response frame may be set based on/using the value of the MLD roaming timer included in the MLD roaming request frame (e.g., to a changed value when the requested timer value is changed). For example, if the value of the MLD roaming timer requested by the STA is used as is and the value of the status code is set to a value indicating success/acceptance, the MLD roaming timer subfield may not be included in the MLD roaming response frame.

Additionally or alternatively, the MLD roaming timer information may include a value for each of one or more NAPs, or may include a value that is common to one or more NAPs. For example, a number of individual MLD roaming timer information corresponding to the number of NAPs may be included in the per-STA profile sub-element of the MLD roaming response frame. For example, a single MLD roaming timer information that is common to one or more NAPs may be included in the common information field of the MLD roaming response frame.

Additionally, the base ML element may include a group ID.

As an example of the present disclosure, a group ID may be included in the common information field of a basic ML element as in Embodiment 1-5-1, and whether the group ID exists in the common information field may be indicated through the presence bitmap subfield of the basic ML element. Accordingly, the MLD roaming response frame may include information about AP(s) affiliated with the same AP group having the group ID indicated through the common information field.

As an example of the present disclosure, when an MLD roaming response frame including a group ID (i.e., when the group ID is included in the link information field) is transmitted as in Embodiment 1-5-2, the group ID may be included in the link information field of the basic ML element of the MLD roaming response frame.

Specifically, the link information field of the basic ML element may include one or more per-STA profile sub-elements, and the STA control field of each of the one or more per-STA profile sub-elements may include a link ID and a group ID (i.e., an ID of an AP group).

Information about one or more APs corresponding to one or more group IDs may be provided through one or more Per-STA profile sub-elements. However, when providing information about AP(s) having the same group ID, overhead may be greater than the method according to embodiment 1-5-1.

As another example of the present disclosure, the STA control field of each Per-STA profile sub-element may include information indicating whether a group ID exists in each of one or more Per-STA profile sub-elements (i.e., group ID presence information).

That is, through the group ID existence information of the STA control field included in the Per-STA profile sub-element, it may be indicated whether the ID of the AP group (i.e., group ID) to which the AP corresponding to the link ID included in the STA control field belongs exists in the Per-STA profile sub-element. Here, the group ID can be included in the STA information field or the STA profile field of the Per-STA profile sub-element.

Information about one or more APs corresponding to one or more group IDs may be provided via one or more Per-STA profile sub-elements.

Additionally or alternatively, the method of embodiment 1-5-1 (i.e., the method in which the group ID is included in the common information field) and the method of embodiment 1-5-3 (i.e., information indicating whether the group ID exists in the STA control field) may be combined. If only information about APs corresponding to the same group ID is provided, the group ID does not need to be included in the Per-STA profile sub-element, thereby reducing overhead.

As an example of the present disclosure, when a unique ID is set within an AP group in the AP MLD as described in Embodiment 1-1-1, if the group ID is 0, the group ID may be omitted. That is, when the group ID does not exist, the AP that has received the MLD roaming request frame can implicitly determine that the request frame is a request for information about other APs regarding the group to which it belongs.

As another example of the present disclosure, if a group ID is included in the common information field, the STA may implicitly determine that the information included in the MLD roaming response frame is information about the AP(s) corresponding to the same group ID. Accordingly, the group ID presence field may not be included in the MLD roaming response frame.

The group key information of order 6 may be set to a value indicating group key information for NAPs. Since the group key may be different for each link, group key information for NAPs needs to be provided. For example, a field corresponding to the group key information may include a subfield indicating the length of a group key information subfield, and a subfield set to a value of the group key information. The group key information may include an MLO GTK (group temporal key) KDE (key data encapsulation) format, an MLO IGTK (integrity group temporal key) KDE, an MLO BIGTK (beacon integrity group temporal key) KDE format, etc., including a link identifier of the NAP.

The AID information in order 7 may manage AIDs for each group. Since the total AID space is limited, AIDs may be managed by AP group. That is, when roaming to another group, a separate AID may be assigned. However, when roaming to another group and assigning the same AID, or when the entire AID space is managed by the AP MLD as before, the AID information in order 7 may not exist.

The channel switching announcement element information and the extended channel switching announcement element information of orders 8 and 9 may be omitted from the MLD roaming response frame when all APs with MLD-based roaming enabled operate on the same channel. When MLD-based roaming is performed on a different channel, the channel information may be provided through the (extended) channel switching announcement element. Additionally or alternatively, the (extended) channel switching announcement element may be included in the STA information/STA profile field of the basic ML element of order 5.

The TID-to-Link mapping information of order 10 may be used to map TIDs in advance through TID-to-Link mapping for a newly connected link. If TID-to-Link mapping is not performed separately, default mapping can be applied to the newly connected link. If the default mapping mode is applied, all TIDs can be mapped to links set up for both DL and UL, and all set up links can be enabled.

MLD Roaming Request/Response Frame Exchange Procedure

Figure 21:
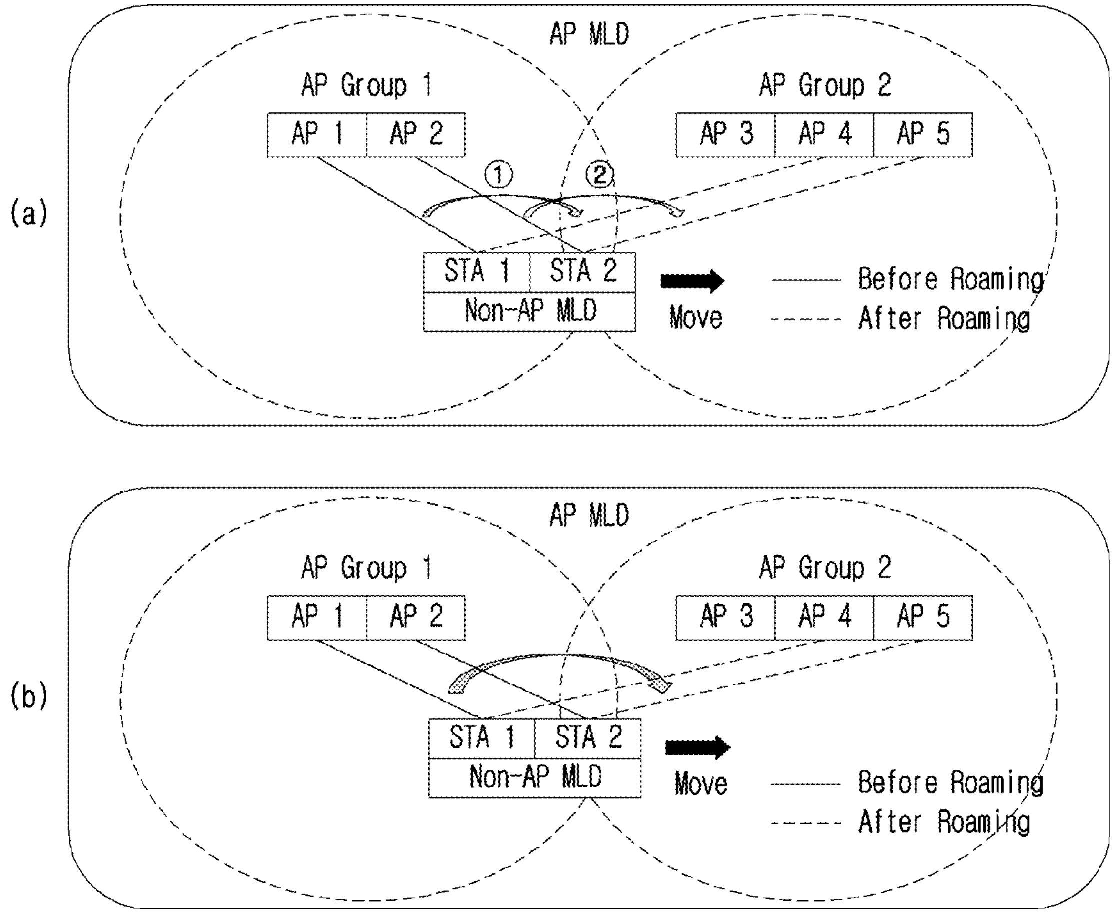
FIG. 21 is a diagram illustrating an example of the structure and procedure of MLD-based roaming according to the present disclosure.

As an example of the present disclosure, (a) of FIG. 21 relates to a procedure in which STAs sequentially roam. For example, STA 1 may first roam from AP 1 to AP 3, and then STA 2 may roam from AP 2 to AP 5. Although (a) of FIG. 21 illustrates a case in which there are two STAs on a non-AP MLD, the present invention is not limited thereto. Even when three STAs are included in a non-AP MLD, two STAs may first perform a roaming operation, and then the remaining STAs may perform a roaming operation.

Specifically, STA 1 and AP 1 may first exchange MLD roaming request/response frames. STA 1 may transmit an MLD roaming request frame indicating a group ID and a link ID for AP 4 to AP 1, and AP 1 may transmit information indicating that it accepts the roaming request and information about AP 4 to STA 1 through a basic ML element included in the MLD roaming response frame.

Then, STA 2 may transmit an MLD roaming request frame indicating a group ID and link ID for AP 5 to AP 2, and AP 2 may transmit information indicating that it accepts the roaming request and information about AP 5 to STA 2 through the basic ML element included in the MLD roaming response frame. Here, all TIDs need to be mapped on the link exchanging each data.

Through the above-described procedure, AP 2 and STA 2 may exchange data while AP 1 and STA 1 are undergoing a roaming procedure. AP 4 and STA 1 may exchange data while AP 2 and STA 2 are undergoing a roaming procedure. Accordingly, data transmission and reception efficiency may be improved while performing a roaming procedure. The above-described procedure may not be applied when one STA is included in the MLD or when a STA other than the MLD requests the roaming procedure.

As another example of the present disclosure, FIG. 21(*b*) illustrates a procedure in which all STAs simultaneously roam to APs in different groups. For example, while STA 1 roams from AP 1 to AP 3, STA 2 may also roam from AP 2 to AP 5.

Specifically, while STA 1 and AP 1 exchange MLD roaming request/response frames, STA 2 and AP 2 may exchange MLD roaming request/response frames. The configuration of the MLD roaming request/response frames exchanged between STA 1/2 and AP 1/2 may be identical to the configuration of the MLD roaming request/response frames exchanged in (a) of FIG. 21.

The procedure according to (b) of FIG. 21 can reduce frame overhead compared to the procedure according to (a) of FIG. 21. However, if the channels are different or data is transmitted by AP group, and the data path is not set to the roaming group, data reception may be interrupted.

However, there may be dependencies in the AP MLD roaming domain structure. For example, assume that there is an anchor AP that receives data from the DS and manages MLD roaming in the AP MLD. In this case, if the anchor AP accepts a roaming request based on the MLD roaming request frame, a data path can be set up in advance in the roaming group.

Embodiment 2

Embodiment 2 relates to a procedure for requesting data transmission to an AP group that will perform roaming via DS.

As an example of the present disclosure, as illustrated in FIG. 13, when an MLD (or STA) roams from AP group 1 to AP group 2, the MLD (or STA) may receive data frames from the AP(s) of the currently associated AP group 1. That is, the MLD (or STA) cannot receive data frames from the AP(s) affiliated with AP group 2 until it is associated with AP group 2.

If all AP groups in the AP MLD domain receive data frames for the corresponding MLD (or STA) from the DS, the MLD (or STA) may receive data frames from AP(s) affiliated with AP group 2 even before it is associated with AP group 2, but this may be inefficient. Accordingly, the MLD (or STA) may receive data frames from APs in AP group 1 until MLD-based roaming is triggered.

Hereinafter, when MLD-based roaming is triggered, a method for an MLD (or STA) to receive data frames in advance from AP(s) of AP group 2 to which it will roam is described.

The DS may map which AP MLD an STA is associated with through the "DS-STA-NOTIFY.request" from the AP MLD. Through this, the DS may transmit data to the AP MLD to which the MLD (or STA) is associated. Table 3 illustrates the primitive parameters of the "DS-STA-NOTIFY.request".

TABLE 3

| Name | Type | Valid range | Description |
|---|---|---|---|
| STA Address | MAC address | valid individual address | If generated by an AP, specifies the address of the STA whose connection status with the AP has changed. If generated by a Mesh Gate, specifies the address of the Mesh STA whose connection status through the Mesh Gate has changed. |
| Update Type | Enumeration | add, move, delete | Specifies the DS mapping update operation to perform. |

Therefore, in order to transmit data to each AP(s) affiliated with an AP group located in multiple areas within the AP MLD, a group ID may be added to the primitive parameter of "DS-STA-NOTIFY.request". That is, data of the MLD (or STA) may be transmitted from the DS only to APs of a group mapped with a group ID in the AP MLD. For example, the primitive parameter of "DS-STA-NOTIFY.request" may include a group ID list. Data may be transmitted from the DS to the AP(s) of the AP group corresponding to the group ID included in the group ID list.

Additionally or alternatively, a "Temporary DS-STA-NOTIFY.request" may be newly configured. That is, a "Temporary DS-STA-NOTIFY.request" may be added so that data can be temporarily received from the DS until the roaming AP group is associated with the AP(s). Each of the "DS-STA-NOTIFY.request" and the "Temporary DS-STA-NOTIFY.request" may include a group ID.

(In order to update the above-described mapping), the MLD (or STA) may transmit i) information requesting to transfer data to the AP group to be roamed to (i.e., OAP) before roaming or/and the AP of the group to be roamed to (i.e., NAP) via a management frame (or action frame) (e.g., "Additional DS-STA-NOTIFY indication") and ii) a group ID. Here, the group ID may indicate the group ID to which the "DS-STA-NOTIFY" is to be updated, and the number of group IDs may be one or more.

Accordingly, a data path for data transmission and reception between the MLD (or STA) and the NAP may be generated by the DS. That is, the MLD (or STA) can perform data transmission and reception with the NAP through the DS.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

The method proposed in this disclosure has been described with a focus on examples applied to IEEE 802.11-based systems, but can be applied to various wireless LANs or wireless communication systems in addition to IEEE 802.11-based systems.

What is claimed is:

1. A method performed by a non-access point (non-AP) multi-link device (MLD), the method comprising:

receiving, from a first access point (AP) MLD, a first frame including information related to a seamless basic service set (BSS) transition, wherein the first AP MLD is a device with which at least one AP is affiliated and a second AP MLD is a device with which at least one AP is affiliated;

transmitting, to the first AP MLD, a first request frame for the seamless BSS transition from the first AP MLD to the second AP MLD, the first request frame including a medium access control (MAC) address of the non-AP MLD, wherein the non-AP MLD is a device with which at least one non-AP station (STA) is affiliated; based on the first request frame, receiving, from the first AP MLD, a first response frame including a status code set to SUCCESS; and performing the seamless BSS transition based on the first response frame, wherein a reconfiguration multi-link element of the first request frame includes a Per-STA profile subelement related to a first non-AP STA affiliated with the non-AP MLD and a first field related to whether the MAC address of the non-AP MLD is included in a common info field of the reconfiguration multi-link element.

2. The method of claim 1, wherein:

the information related to the seamless BSS transition includes at least one of an identifier (ID) related to the seamless BSS transition and information related to whether the seamless BSS transition is supported.

3. The method of claim 1, wherein:

the first response frame includes time information related to whether the seamless BSS transition is completed and a group key related to the second AP MLD.

4. The method of claim 1, wherein:

a second frame for requesting information related to the second AP MLD is transmitted from the first non-AP STA to the first AP MLD, a third frame in response to the second frame including information related to the second AP MLD is transmitted from the first AP MLD to the first non-AP STA.

5. The method of claim 1, wherein:

based on a triggering of roaming to the second AP MLD, a third request frame requesting data transmission and reception with the second AP MLD is transmitted from the first non-AP STA to the first AP MLD via a distributed system (DS), and the third request frame includes an ID associated with the second AP MLD.

6. The method of claim 1, wherein:

the MAC address of the non-AP MLD is included in the common info field.

7. The method of claim 1, wherein:

the first response frame includes a basic ML element, and the basic ML element includes an AID for the first non-AP STA and traffic identifier-to-link mapping information.

8. A non-access point (non-AP) multi-link device (MLD) comprising:

at least one transceiver; and at least one processor coupled to the at least one transceiver, wherein the at least one processor is configured to:

receive, from a first access point (AP) MLD, a first frame including information related to a seamless basic service set (BSS) transition through the at least one transceiver, wherein the first AP MLD is a device with which at least one AP is affiliated and a second AP MLD is a device with which at least one AP is affiliated;

transmit, to the first AP MLD, a first request frame for the seamless BSS transition from the first AP MLD to the second AP MLD, the first request frame including a medium access control (MAC) address of the non-AP MLD through the at least one transceiver, wherein the non-AP MLD is a device with which at least one non-AP station (STA) is affiliated;

based on the first request frame, receive, from the first AP MLD, a first response frame including a status code set to SUCCESS, through the at least one transceiver; and perform the seamless BSS transition based on the first response frame, wherein a reconfiguration multi-link element of the first request frame includes a Per-STA profile subelement related to a first non-AP STA affiliated with the non-AP MLD and a first field related to whether the MAC address of the non-AP MLD is included in a common info field of the reconfiguration multi-link element.

9. A first access point (AP) multi-link device (MLD) comprising:

at least one transceiver; and at least one processor coupled to the at least one transceiver, wherein the at least one processor is configured to:

transmit, to a non-access point (non-AP) MLD, a first frame including information related to a seamless basic service set (BSS) transition through the at least one transceiver, wherein the first AP MLD is a device with which at least one AP is affiliated and a second AP MLD is a device with which at least one AP is affiliated;

receive, from the non-AP MLD, a first request frame for the seamless BSS transition from the first AP MLD to the second AP MLD, the first request frame including a medium access control (MAC) address of the non-AP MLD through the at least one transceiver, wherein the non-AP MLD is a device with which at least one non-AP station (STA) is affiliated; and based on the first request frame, transmit, to the non-AP MLD, a first response frame including a status code set to SUCCESS, through the at least one transceiver, wherein the seamless BSS transition is based on the first response frame, and wherein a reconfiguration multi-link element of the first request frame includes a Per-STA profile subelement related to a first non-AP STA affiliated with the non-AP MLD and a first field related to whether the MAC address of the non-AP MLD is included in a common info field of the reconfiguration multi-link element.

* * * * *